United States Patent
Asano et al.

(10) Patent No.: US 9,575,525 B2
(45) Date of Patent: Feb. 21, 2017

(54) SEMICONDUCTOR INTEGRATED CIRCUIT DEVICE

(71) Applicant: RENESAS ELECTRONICS CORPORATION, Kawasaki-Shi (JP)

(72) Inventors: Masahiro Asano, Kawasaki (JP); Yuriko Nishihara, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 748 days.

(21) Appl. No.: 13/777,702

(22) Filed: Feb. 26, 2013

(65) Prior Publication Data
US 2013/0179702 A1 Jul. 11, 2013

Related U.S. Application Data

(63) Continuation of application No. 12/750,209, filed on Mar. 30, 2010, now Pat. No. 8,392,731.

(30) Foreign Application Priority Data

| May 20, 2009 | (JP) | 2009-121861 |
| Dec. 1, 2009 | (JP) | 2009-273114 |
| Mar. 5, 2010 | (JP) | 2010-048915 |

(51) Int. Cl.
*G06F 1/26* (2006.01)
*H04L 12/40* (2006.01)
(Continued)

(52) U.S. Cl.
CPC .......... *G06F 1/26* (2013.01); *H04L 12/40013* (2013.01); *H04L 12/40039* (2013.01); *Y02B 60/32* (2013.01)

(58) Field of Classification Search
CPC ............ G06F 1/26; G06F 13/26; G06F 15/17; H03B 1/00
(Continued)

(56) References Cited

U.S. PATENT DOCUMENTS

| 4,698,748 A | 10/1987 | Juzswik et al. |
| 5,081,586 A | 1/1992 | Barthel et al. |
(Continued)

FOREIGN PATENT DOCUMENTS

| DE | 10358584 A1 | 7/2004 |
| EP | 1158718 A2 | 11/2001 |
(Continued)

OTHER PUBLICATIONS

Chinese Office Action issued in Application No. 201010158277.9 dated Nov. 21, 2013.
(Continued)

*Primary Examiner* — Henry Tsai
*Assistant Examiner* — Christopher a Daley
(74) *Attorney, Agent, or Firm* — McDermott Will & Emery LLP

(57) ABSTRACT

Power supply of ECUs connected to a communication network is optimally controlled so that power consumption is reduced. A transceiver/receiver converts a message of a differential signal received via a CAN bus into a digital signal. A select circuit determines whether the converted message is in a CAN format or a UART format. If it is in the UART format, the select circuit outputs a message to the UART circuit. A UART circuit determines whether the message matches a UART format. If matched, an ID determination circuit determines whether the input message is specifying a CAN ID of its own ECU. If it is the CAN ID of the ECU, the ID determination circuit outputs an enable signal to turn on a regulator and supply power to an MCU and an actuator.

5 Claims, 17 Drawing Sheets

(51) Int. Cl.

| | | |
|---|---|---|
| H03B 1/00 | (2006.01) | |
| G06F 13/24 | (2006.01) | |
| G06F 13/26 | (2006.01) | |
| G06F 15/17 | (2006.01) | |

(58) Field of Classification Search
USPC .......................................... 713/300; 327/112
See application file for complete search history.

(56) References Cited

U.S. PATENT DOCUMENTS

| | | | |
|---|---|---|---|
| 5,196,728 A | 3/1993 | Jaux | |
| 5,892,893 A * | 4/1999 | Hanf .................... | G06F 1/3209 714/14 |
| 6,282,668 B1 | 8/2001 | Neudecker | |
| 6,438,462 B1* | 8/2002 | Hanf et al. ................... | 700/297 |
| 6,728,892 B1 | 4/2004 | Silvkoff et al. | |
| 6,806,690 B2* | 10/2004 | Xi ................................ | 323/273 |
| 6,838,783 B2 | 1/2005 | Stierle et al. | |
| 6,851,067 B2* | 2/2005 | Indefrey ................ | H04L 12/12 713/320 |
| 6,897,715 B2* | 5/2005 | Barber et al. ................. | 327/541 |
| 7,148,670 B2* | 12/2006 | Inn et al. ...................... | 323/283 |
| 7,196,431 B2 | 3/2007 | Eckert et al. | |
| 7,210,049 B2 | 4/2007 | Disser | |
| 7,263,416 B2 | 8/2007 | Sakurai et al. | |
| 7,386,853 B2 | 6/2008 | Hanzawa | |
| 7,523,334 B2* | 4/2009 | Marais .................... | H04L 12/12 701/36 |
| 7,539,888 B2* | 5/2009 | Hu ................... | H04L 12/40039 713/320 |
| 7,783,908 B2 | 8/2010 | Bogovac | |
| 7,840,706 B1* | 11/2010 | Abdulla ................. | H04L 49/90 709/245 |
| 7,890,229 B2 | 2/2011 | Huebl | |
| 8,483,848 B2* | 7/2013 | Langejurgen ........... | H04L 12/40 5/600 |
| 8,618,780 B2* | 12/2013 | Mounier et al. .............. | 323/277 |
| 8,790,229 B2* | 7/2014 | Font Lletche .......... | B31B 19/84 493/213 |
| 8,966,302 B2* | 2/2015 | Sinha .................... | G06F 1/3203 713/323 |
| 2002/0141438 A1 | 10/2002 | Smith et al. | |
| 2004/0199701 A1 | 10/2004 | Eckmuller | |
| 2005/0052081 A1* | 3/2005 | Sayama ....................... | 307/10.1 |
| 2005/0102430 A1 | 5/2005 | Huber et al. | |
| 2006/0004545 A1 | 1/2006 | Souda | |
| 2006/0168378 A1 | 7/2006 | Muth | |
| 2009/0230902 A1 | 9/2009 | Nakagami et al. | |
| 2010/0191995 A1* | 7/2010 | Levy ..................... | G06F 1/3209 713/323 |
| 2010/0229017 A1 | 9/2010 | Ito | |
| 2011/0107130 A1 | 5/2011 | Huebl | |
| 2012/0185726 A1* | 7/2012 | Duron ................. | G06F 11/2028 714/11 |
| 2013/0080811 A1* | 3/2013 | Low ...................... | G06F 1/3259 713/323 |
| 2013/0318380 A1* | 11/2013 | Behrens ................. | H04L 12/12 713/323 |

FOREIGN PATENT DOCUMENTS

| | | |
|---|---|---|
| FR | 2917555 A3 | 12/2008 |
| JP | 2001-268559 A | 9/2001 |
| JP | 2004-535742 A | 11/2004 |
| JP | 2005529393 A | 9/2005 |
| JP | 2006-020038 A | 1/2006 |
| JP | 2006109161 A | 4/2006 |
| JP | 2006-327217 A | 12/2006 |
| WO | 0247324 A2 | 6/2002 |
| WO | WO-03/009537 A1 | 1/2003 |
| WO | 2007130730 A2 | 11/2007 |
| WO | 2009041151 A1 | 4/2009 |

OTHER PUBLICATIONS

Japanese Office Action issued in Application No. 2013-155995 dated Apr. 1, 2014.
Extended European Search Report issued in Application No. 13188024.7 mailed Nov. 27, 2013.
Extended European Search Report issued in Application No. 13188020.5 mailed Dec. 13, 2013.
Chinese Office Action issued in Application No. 201010158277.96 dated Nov. 21, 2013.
Wattersnon, Conal AN-1123 Application Note. Revision o. Feb. 2012.
Dammeyer, John. A large scale CAN bus system. CAN in Automation. 2012.
STMicorelectronics. L4969 System Voltage Regulator with Fault Tolerant Low-Speed CAN Transceiver. Sep. 2000.
Hiroyuki Hattori, "Example of Control in TOPPERS/OSEK by LIN Communication Driver", Interface, CQ Publishing Co., Ltd., Japan, p. 78-87, Apr. 1st, 2005.
European Search Report issued in Application No. 10250593.0-1505 dated Jul. 11, 2013.
Japanese Office Action issued in Application No. 2010-048915 dated May 28, 2013.

* cited by examiner

SEMICONDUCTOR INTEGRATED CIRCUIT DEVICE

CROSS-REFERENCE TO RELATED APPLICATIONS

This application is a continuation of U.S. application Ser. No. 12/750,209, filed Mar. 30, 2010, now U.S. Pat. No. 8,392,731, which claims priorities under 35 U.S.C. §119 to Japanese Patent Application No. JP 2009-121861 filed on May 20, 2009, Japanese Patent Application No. JP 2009-273114 filed on Dec. 1, 2009, and Japanese Patent Application No. JP 2010-048915 filed on Mar. 5, 2010, the entire contents of which are hereby incorporated by reference into this application.

TECHNICAL FIELD OF THE INVENTION

The present invention relates to an electric-power-supply management technique in a communication network. More particularly, the present invention relates to a technique effective for reducing electric power consumption of a semiconductor integrated circuit device used in a communication network system in which communication is carried out via a controller area network (CAN) bus.

BACKGROUND OF THE INVENTION

Many electric control units (ECUs) which handle various control of information systems such as a navigation system and an audio system, power-train systems such as an engine and a chassis, and body systems such as an air conditioner, headlights, and doorlocks, are mounted in a vehicle.

For example, CAN is widely used as a protocol of a communication network which connects these ECUs. The ECUs mounted in a vehicle can be divided into the ECUs which are always executing control of, for example, engine, brake, and airbag, and the ECUs which are required to be operated only when events such as opening/closing of a sunroof occurs. Meanwhile, CAN has the specifications in which all the ECUs become the ON-state after the engine is started or the electric power is supplied in the vehicle.

As data transmission techniques in this type of communication network, for example, the technique which use a CAN bus for storing data or carrying out diagnosis without using the CAN protocol (see Japanese Patent Application Laid-Open Publication No. 2004-535742 (Patent Document 1)) and the technique which enable data communication by a universal asynchronous receiver transmitter (UART) regardless of the communication protocol of a wired LAN (see Japanese Patent Application Laid-Open Publication No. 2006-020038 (Patent Document 2)) are known.

SUMMARY OF THE INVENTION

However, the inventors of the present invention have found out that the above-described communication techniques according to the communication network protocols have following problems.

The ECUs mounted in the vehicle can be divided into the ECUs which are always executing control of, for example, engine, brake, airbag, and so forth (the frequency of occurrence of the events for which message transmission/reception is to be carried out is relatively high) and the ECUs which are required to operate only when the events such as opening/closing of the sunroof occur (the frequency of occurrence of the events for which message transmission/reception is to be carried out is relatively low).

In the case of the ECUs which are required to operate only when the events occur, electric power consumption can be suppressed if the power of the ECUs is turned on only when the events occur. However, as described above, all the ECUs become the ON-state after the engine is started, and electric power is always consumed by the many ECUs.

The electricity used in the vehicle is generated by an alternator (AC generator) driven by the power of the engine. Therefore, when electric power consumption is low, the load imposed on the alternator is reduced, and consumption of the fuel is also reduced (it means the fuel efficiency of the vehicle is increased); however, when the electric power consumption is increased, the electric power generating load of the vehicle is increased, and the fuel efficiency of the vehicle is lowered, that is problematic.

As the number of the ECUs mounted in a vehicle is increasing year by year, the electric power consumed by these ECUs is also increasing, and a risk of further larger reduction in the fuel efficiency of the vehicle is generated.

On the other hand, the ECUs of engine, brake, and the like which are necessary for safely driving the vehicle relatively frequently carry out communication via a communication network, and disturbing the communication leads to obstructing safe drive of the vehicle. Also from this point of view, the communication from or to the non-urgent ECUs have to be suppressed, and, at the same time, the communication which does not obstruct safe drive of the vehicle have to be carried out when the communication with such ECUs is to be carried out.

It is a preferred aim of the present invention to provide a technique capable of significantly reducing electric power consumption of a vehicle by optimally controlling an electric power supply of ECUs connected to a communication network.

The above and other preferred aims and novel characteristics of the present invention will be apparent from the description of the present specification and the accompanying drawings.

The typical ones of the inventions disclosed in the present application will be briefly described as follows.

The present invention includes: a communication protocol interface serving as an interface of a first communication protocol inputted via a communication bus; a controller controlling an actuator etc. based on a message inputted via the communication protocol interface; a first regulator supplying power to the communication protocol interface; and a second regulator supplying and stopping power to the controller and the actuator etc. based on a control signal outputted from the communication protocol interface, wherein the communication protocol interface generates the control signal based on a message of a second communication protocol that is different from the first communication protocol transferred from the communication bus.

Further, other typical ones of the inventions described in the present application will be briefly described below.

In the present invention, the communication protocol interface includes a protocol determination unit determining whether the message transferred via the communication bus is a message of the first communication protocol or a message of the second communication protocol, and transmitting the message to the controller if the message is the message of the first communication protocol; and an ID determination unit into which the message is inputted when the protocol determination unit determines the message is the message of the second communication protocol, the ID determination unit detecting a recognition number in the message, determining whether the detected recognition number and a recognition number individually allocated to the semiconductor integrated circuit device match, and, if matched, outputting the control signal which operates the second regulator.

In addition, the present invention further includes a timer which measures idle time of the controller when a power-source voltage is supplied to the controller, wherein the controller outputs a power-off instruction signal to the ID determination unit when the idle time of the controller of a given time elapses, and the ID determination unit outputs the control signal which stops operation of the second regulator when the power-off instruction signal is received.

Further, in the present invention, the communication protocol interface includes a power-supply operation information storage unit storing operation information indicating whether the ID determination unit operated or stopped the second regulator, and, when the ID determination unit operates the second regulator or stops the second regulator, the ID determination unit stores the operation in the power-supply operation information storage unit.

In addition, in the present invention, the controller outputs a communication stop message for stopping communication according to the first communication protocol via the communication bus according to the first communication protocol to all of the semiconductor integrated circuit devices carrying out communication according to the first communication protocol so as to stop the communication of the semiconductor integrated circuit devices, then the controller transfers a message of the second communication protocol via the communication bus to any semiconductor integrated circuit device desired to participate in the communication according to the first communication protocol so as to operate the second regulator of any of the semiconductor integrated circuit device.

Further, in the present invention, the semiconductor integrated circuit device caused to stop the communication according to the first communication protocol resumes the communication according to the first communication protocol after a given time set by the communication stop message elapses.

In addition, in the present invention, in the semiconductor integrated circuit device caused to stop the communication according to the first protocol, the operation of the second regulator is stopped until the communication protocol interface transfers a message for operating the second regulator according to the second communication protocol.

Further, in the present invention, the controller outputs a system activation message according to the second communication protocol via the communication bus, the message being for operating the first regulator, activating the semiconductor integrated circuit device, and starting communication according to the first communication protocol; the controller checks whether any plugged-in semiconductor integrated circuit device is present among the activated semiconductor integrated circuit devices; and, if the plugged-in semiconductor integrated circuit device is present, the controller acquires, according to the first communication protocol, operation recognition information at least including the recognition number from the plugged-in semiconductor integrated circuit device.

In addition, in the present invention, when the semiconductor integrated circuit device is operated by an external trigger, the second regulator does not stop power supply to the controller and the actuator, the controller becomes a standby state, and the communication protocol interface is in a state in which a message according to the second communication protocol can be received.

Further, in the present invention, when the controller detects the external trigger and transitions from the standby state to an operation state, the controller transfers an activation notification signal, which notifies that the semiconductor integrated circuit device is activated by the external trigger, to the communication bus.

Moreover, in the present invention, when the controller detects the external trigger and transitions from the standby state to an operation state, the controller sets the communication protocol interface so that the communication protocol interface starts communication according to the first communication protocol, and, when an inquiry whether the semiconductor integrated circuit device is activated by the external trigger is generated, the controller gives a notification about the activation.

Furthermore, in the present invention, the first communication protocol is a communication protocol for a vehicle, which is a communication protocol such as CAN or FlexRay™ mainly used in an in-vehicle network.

Moreover, in the present invention, the second communication protocol is composed of a communication protocol such as UART mainly used in the communication between semiconductor integrated circuit devices or a communication protocol such as local interconnect network (LIN) used in an in-vehicle network in a dependent manner. A configuration of a communication message of the second communication protocol is the same as that of CAN or FlexRay™; however, this protocol is composed of a communication protocol having a different communication frequency.

The effects obtained by typical aspects of the present invention will be briefly described below.

(1) Electric power supply can be stopped when operations of a controller and an actuator etc. are unnecessary. Therefore, electric power consumption of semiconductor integrated circuit devices can be significantly reduced.

(2) Moreover, in predetermined situations, communication between ECUs is stopped or the operation of the semiconductor integrated circuits in the ECUs is stopped. As a result, in addition to achieving lower electric power consumption and higher fuel efficiency, safety of a vehicle can be improved.

BRIEF DESCRIPTIONS OF THE DRAWINGS

FIG. 13 is an operation flow chart illustrating an example of communication according to a third embodiment of the present invention between a master ECU and slave ECUs having an ECU being plugged in;

DESCRIPTIONS OF THE PREFERRED EMBODIMENTS

First Embodiment

Figure 1:
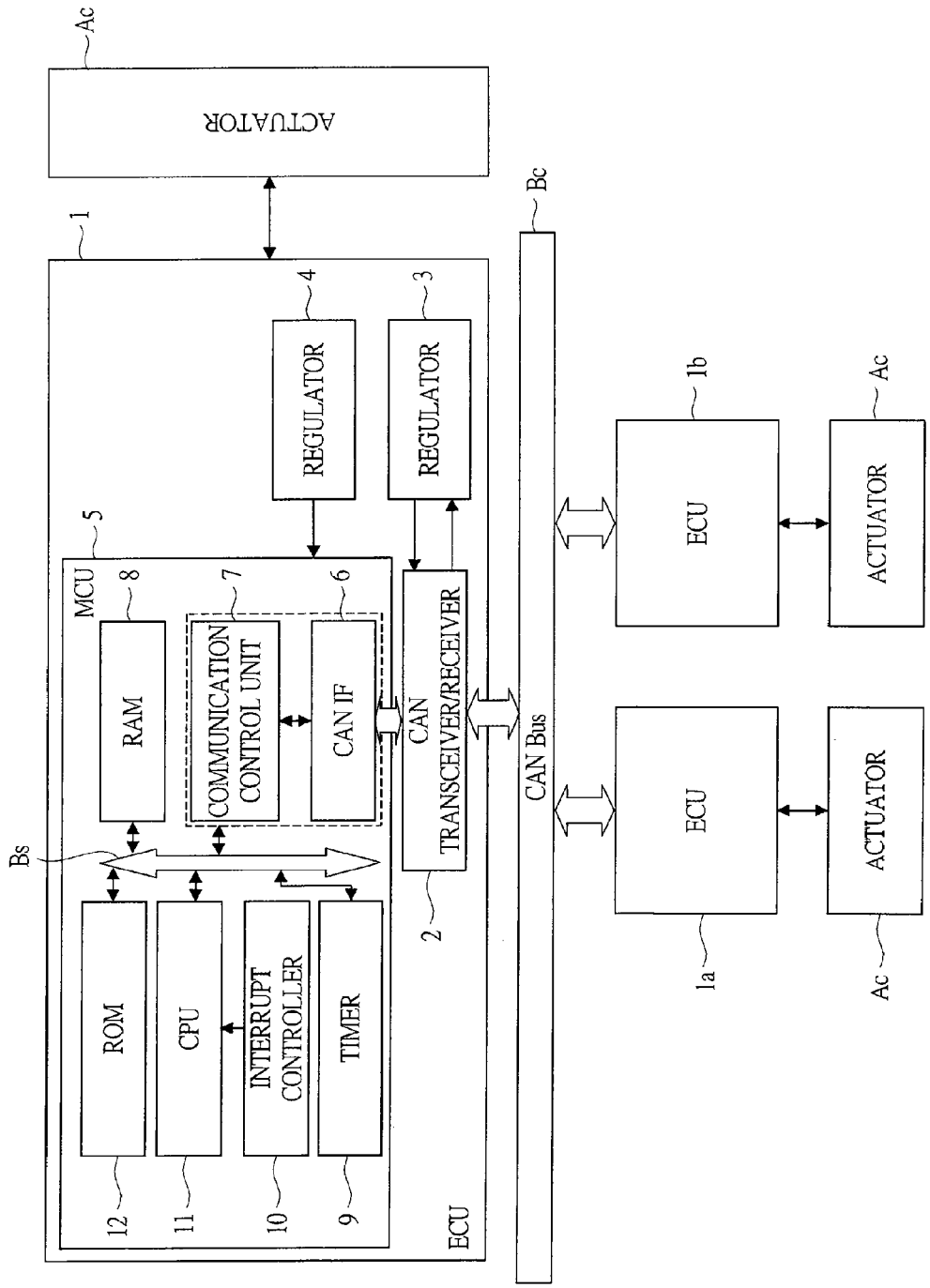
FIG. 1 is a block diagram illustrating an example of a connection mode of an in-vehicle network according to a first embodiment of the present invention.
Figure 2:
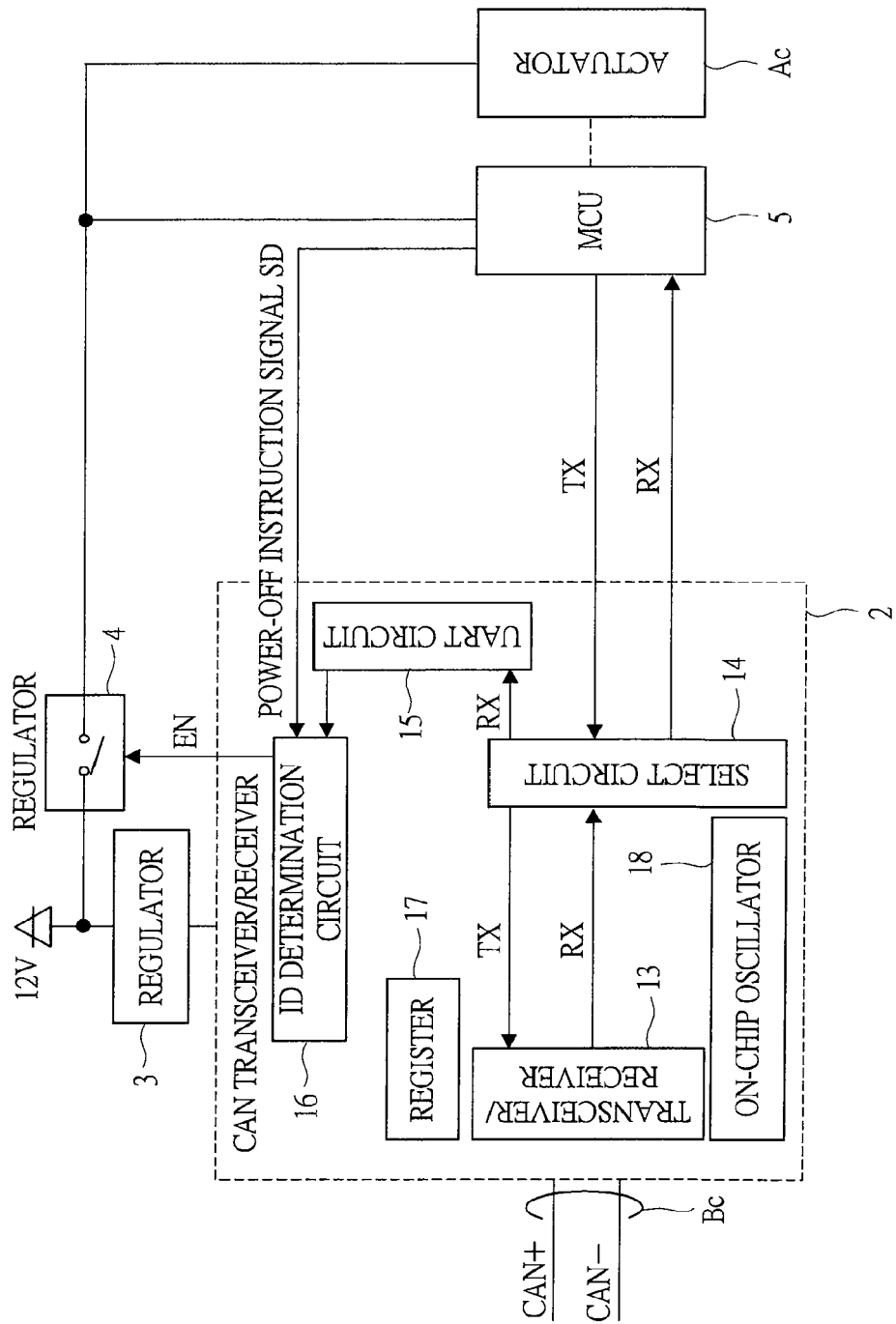
FIG. 2 is a block diagram illustrating an example of a configuration of a CAN transceiver/receiver provided in an ECU of FIG. 1.
Figure 3:
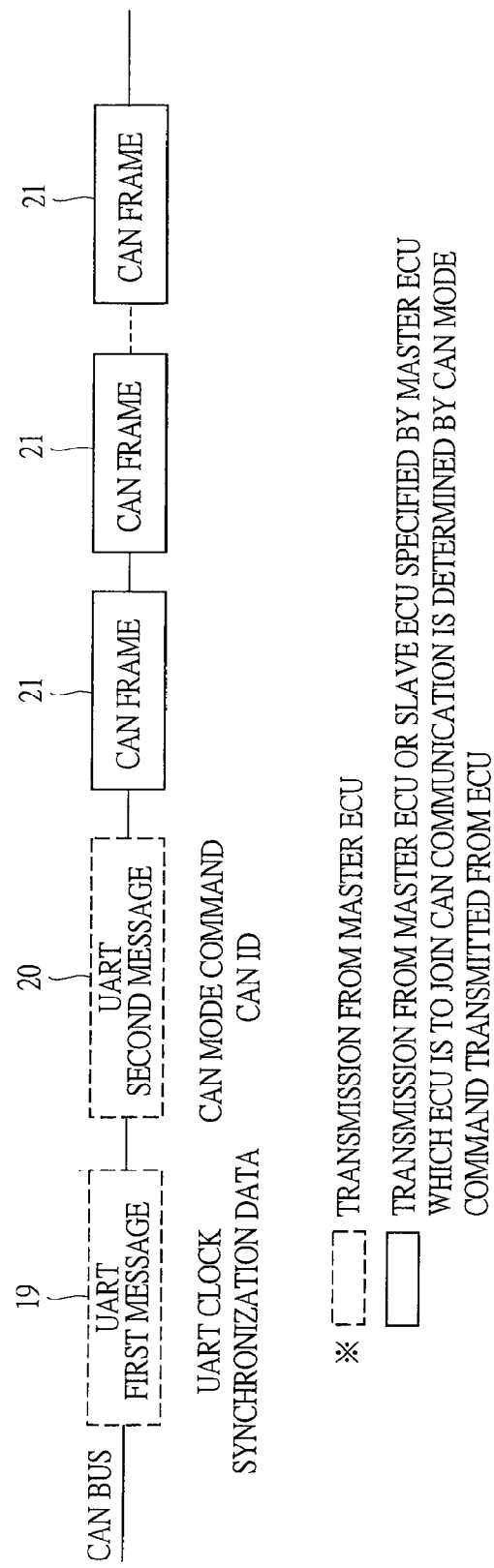
FIG. 3 is an explanatory diagram illustrating an example of a communication format transferred via a CAN bus according to the first embodiment of the present invention.
Figure 4:
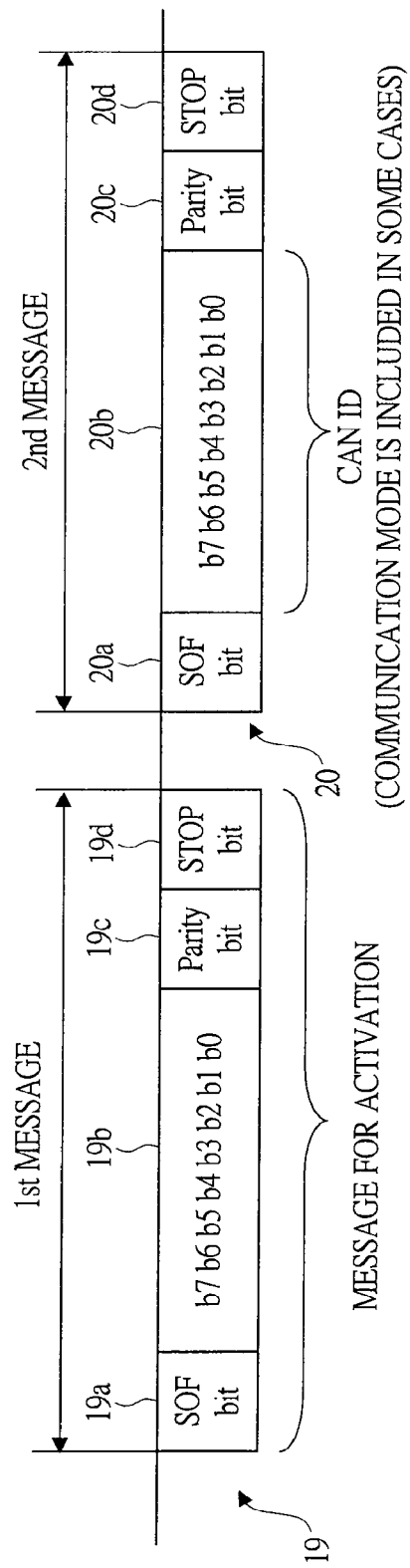
FIG. 4 is an explanatory diagram illustrating an example of a UART (universal asynchronous receiver transmitter) data format of FIG. 3.
Figure 5:
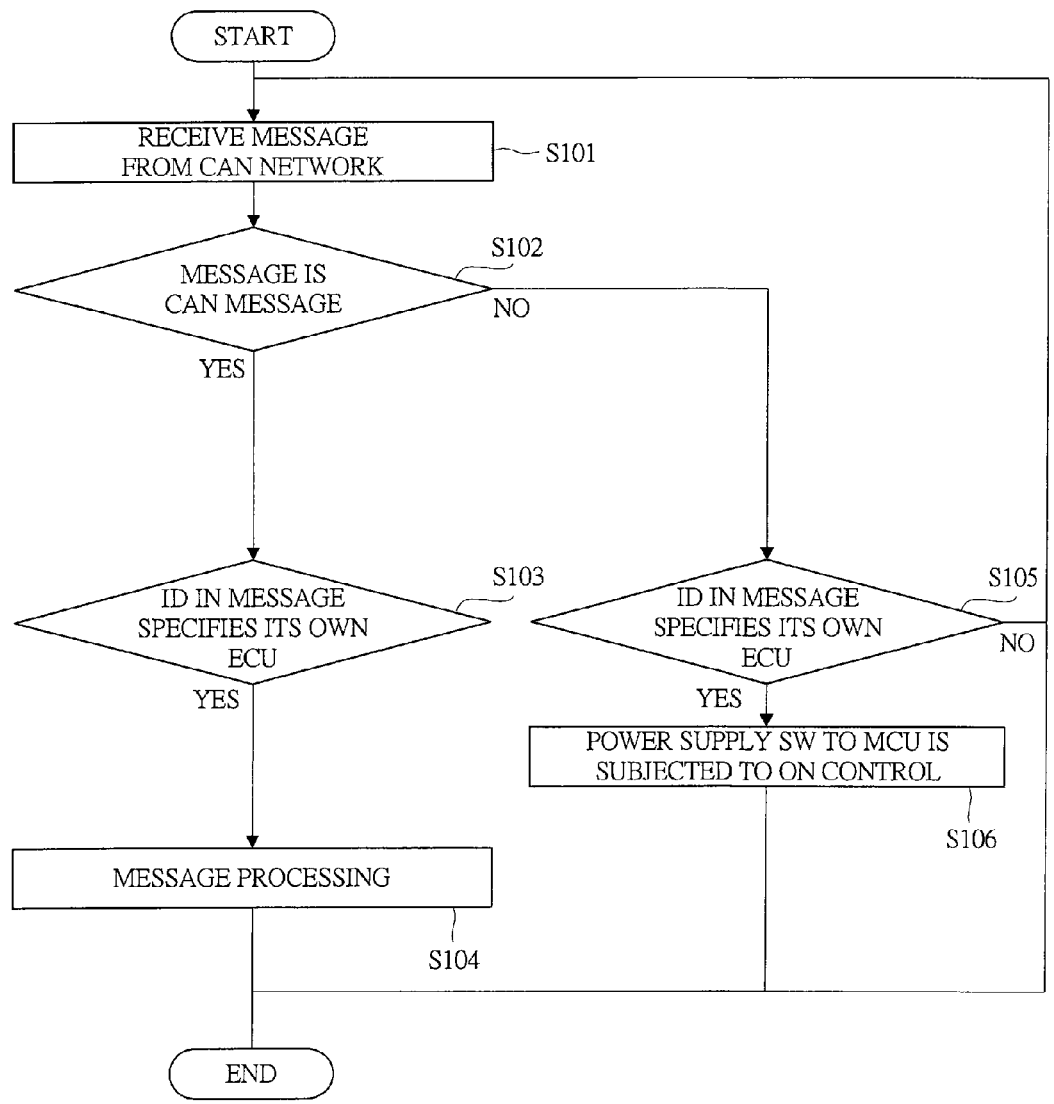
FIG. 5 is a flow chart illustrating an example of operations in the ECU of FIG. 2.
Figure 6:
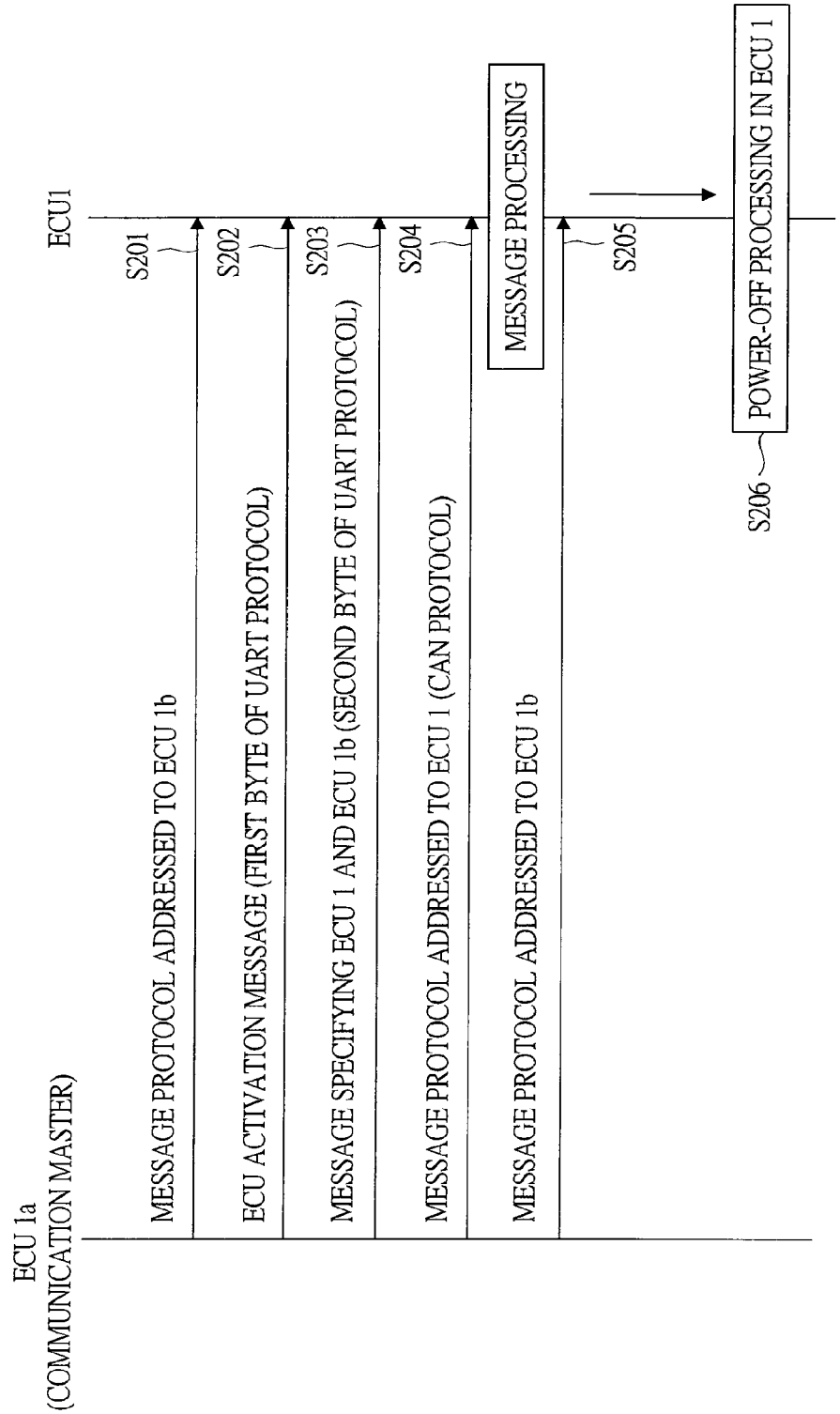
FIG. 6 is an operation flow chart illustrating an example of communication between a master ECU and a slave ECU according to the first embodiment of the present invention.
Figure 7:
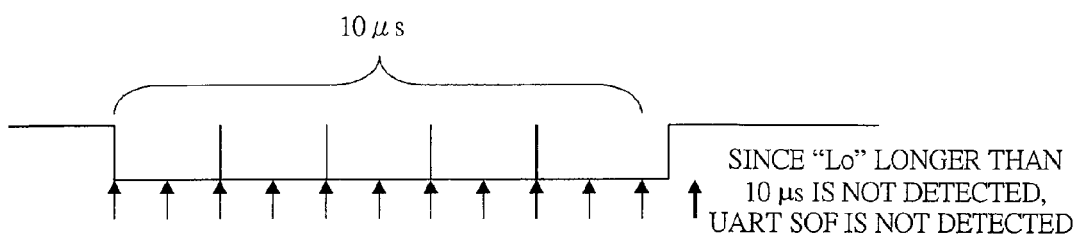
FIG. 7 is an explanatory diagram illustrating an example of a baud rate of CAN communication upon a filtering by a CAN transceiver/receiver of FIG. 2.
Figure 8:
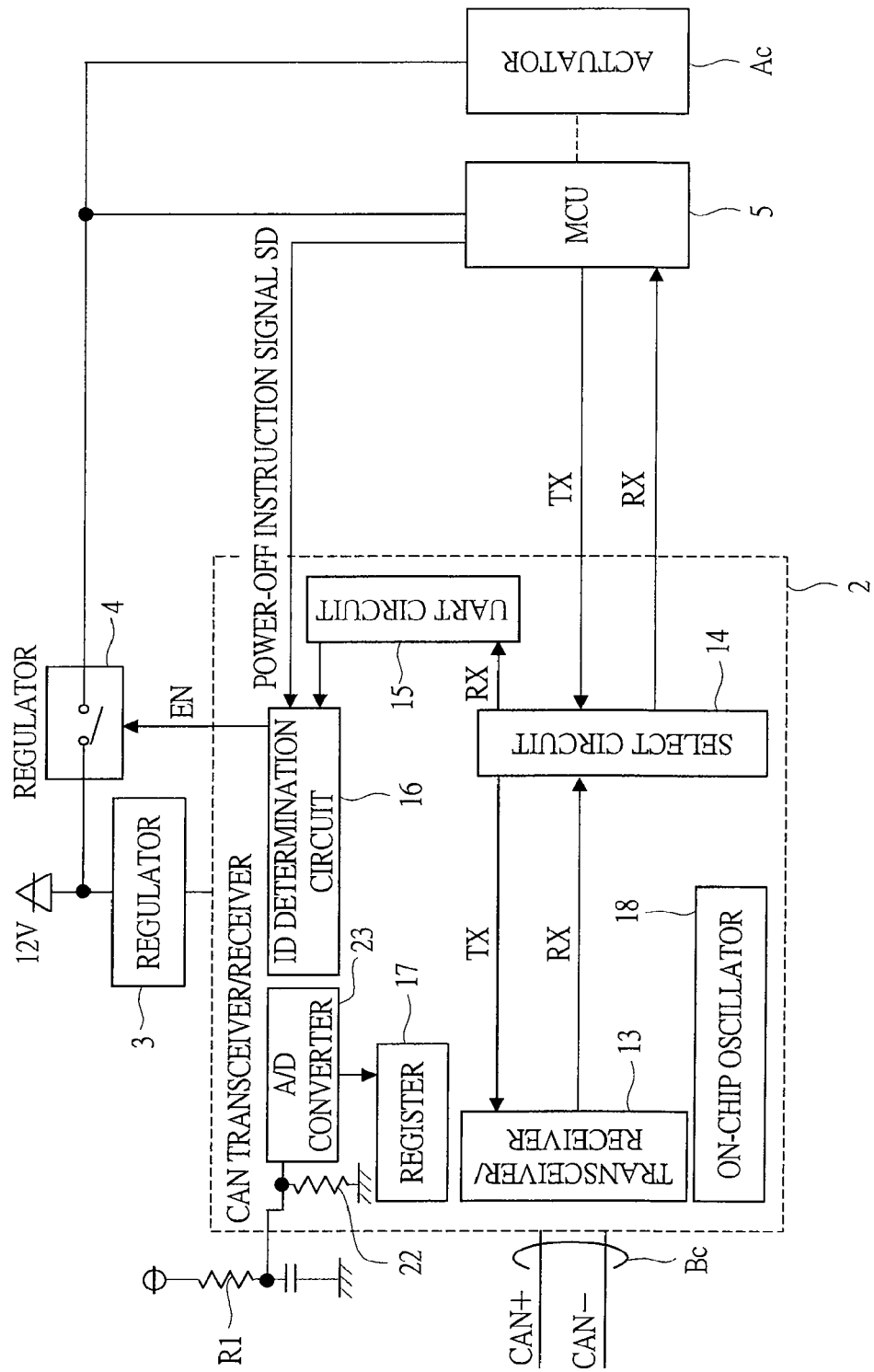
FIG. 8 is a block diagram illustrating another example of the configuration of the CAN transceiver/receiver of FIG. 2.

FIG. 1 is a block diagram illustrating an example of a connection mode of an in-vehicle network according to a first embodiment of the present invention, FIG. 2 is a block diagram illustrating an example of a configuration of a CAN transceiver/receiver provided in an ECU of FIG. 1, FIG. 3 is an explanatory diagram illustrating an example of a communication format transferred via a CAN bus according to the first embodiment of the present invention, FIG. 4 is an explanatory diagram illustrating an example of a UART (universal asynchronous receiver transmitter) data format of FIG. 3, FIG. 5 is a flow chart illustrating an example of operations in the ECU of FIG. 2, FIG. 6 is an operation flowchart illustrating an example of communication between a master ECU and a slave ECU according to the first embodiment of the present invention, FIG. 7 is an explanatory diagram illustrating an example of a baud rate of CAN communication upon a filtering by a CAN transceiver/receiver of FIG. 2, and FIG. 8 is a block diagram illustrating another example of the configuration of the CAN transceiver/receiver of FIG. 2.

In the first embodiment, as illustrated in FIG. 1, the connection mode of the in-vehicle network of a vehicle is composed of a configuration in which a plurality of ECUs 1, 1a, and 1b are mutually connected via a CAN bus Bc serving as a communication bus. These ECUs 1, 1a, and 1b are control devices having semiconductor integrated circuits which carry out various control of, for example, information systems such as a navigation system and audio systems, power train systems such as an engine and a chassis, body systems such as an air conditioner, headlights, and door locks, and so forth. Each of the ECUs 1, 1a, and 1b is connected to an actuator Ac controlled by the respective ECU 1, 1a, or 1b. However, the ECU(s) which is not connected to the actuator may be present.

The ECU 1 is composed of a CAN transceiver/receiver 2, regulators 3 and 4, and a micro controller unit (MCU) 5 that serves as a controller. The ECU 1 (1a, 1b) is mutually connected with the CAN bus Bc via the CAN transceiver/receiver 2. Differential signals of the CAN protocol which is a first communication protocol or differential signals of the UART protocol which is a second communication protocol are transferred to the CAN bus Bc.

The CAN transceiver/receiver 2, which serves as an electric interface of communication, converts differential signals inputted via the CAN bus Bc into digital signals, converts digital signals outputted from the MCU 5 into differential signals, and outputs the converted differential signals to the CAN bus Bc. Also, the CAN transceiver/receiver 2 determines whether a communication protocol of the differential signals inputted via the CAN bus Bc is a CAN protocol or a UART protocol; and, when the determination result is the UART protocol, the CAN transceiver/receiver 2 carries out an analysis of UART data and controls the regulator 4 based on that analysis.

The regulator 3, which serves as a first regulator, is a regulator which regulates a power-source voltage supplied from, for example, a battery of the vehicle and supplies the voltage as operation power source of the CAN transceiver/receiver 2.

The regulator 4, which serves as a second regulator, is a regulator which regulates a power-source voltage supplied from the battery or the like of the vehicle based on the control output from the CAN transceiver/receiver 2 and supplies the voltage as operation power source of the MCU 5 and the actuator Ac.

The MCU 5 is composed of a CAN interface 6, a communication control unit 7, a Random Access Memory (RAM) 8, a timer 9, an interrupt controller 10, a central processing unit (CPU) 11, and a read only memory (ROM) 12. The communication control unit 7, the RAM 8, the timer 9, the CPU 11, and the ROM 12 are mutually connected via an internal bus Bs.

When transmission of a message is to be carried out with respect to another ECU by the CAN protocol or the UART protocol, the MCU 5 transmits a digital signal of the message, which is to be transmitted, and the information, which indicates which protocol is to be used for the transmission, to the CAN transceiver/receiver 2.

The CAN interface 6 is an interface between the MCU 5 and the CAN bus Dc. The communication control unit 7 controls communication with other ECUs in accordance with the CAN protocol. The RAM 8 is used for temporary storage of data and is used, for example, for temporary saving of data received from a CAN network and data to be transmitted to the CAN network.

The timer 9 carries out count-up of a timer clock or the like, sets desired time, and, when it reaches certain time, outputs a timer counter signal. When there is a program which is to be executed in priority to the program which is being executed, the interrupt controller 10 controls halt of the program which is being executed and execution of the interrupt program. When the interrupt program is finished, the halted program is resumed. Normally, the interrupt controller 10 controls internal interrupts from the inside of the MCU 5 and external interrupts from the outside of the MCU 5.

For example, when there is no data reception from the CAN network for a certain period of time, the interrupt controller receives a timeout signal outputted from the timer 9, generates the interrupt program, and outputs an interrupt processing signal.

The CPU 11 carries out all the control in the MCU 5. The ROM 12 mainly stores operation programs of the MCU 5. The operation programs are, for example, a CAN communication program, an actuator control program, a power-off processing program, and the like.

Herein, the configuration of the ECU 1 is described. However, the other ECUs 1a and 1b also have configurations similar to that of the ECU 1.

FIG. 2 is a block diagram illustrating an example of the configuration of the CAN transceiver/receiver 2.

As illustrated in the diagram, the CAN transceiver/receiver 2 is composed of a transceiver/receiver 13, a select circuit 14 serving as a protocol determination unit, a DART circuit 15, an ID determination circuit 16 serving as an ID determination unit, a register 17 serving as a power-supply operation information storage unit, and an on-chip oscillator 18.

As described above, the CAN transceiver/receiver 2 is connected to the MCU 5. The actuator Ac is connected to the MCU 5, and the MCU 5 drives and controls the actuator Ac.

The transceiver/receiver 13 converts differential signals, which are inputted via the CAN bus Bc, into digital signals, converts digital signals, which are outputted from the MCU 5, into differential signals, and outputs the signals to the CAN bus Bc.

The select circuit 14 discriminates the protocol of the signals, which are received from the CAN bus Bc, by the following method.

In the case in which the communication according to the CAN protocol and the communication according to the UART protocol can be superimposed, for example, different communication frequency bands are used (the CAN protocol communication is carried out in a high frequency band, and the UART protocol communication is carried out in a low frequency band). Publicly known techniques such as contactless IC cards and electric-power line communication exist for the communication carried out by superimposing signals of different frequency bands in this manner, and such techniques can be suitably employed.

Upon reception, the signal received from the CAN bus Bc is separated by AM demodulation, and the analog signal of the separated protocol signals is converted into a digital signal. Upon transmission, a digital signal of a message is converted into an analog signal of the communication frequency band corresponding to the protocol based on the information indicating which protocol is to be used for the transmission, and the converted analog signal is superimposed by AM modulation and outputted to the CAN bus Bc.

Alternatively, when the communication according to the CAN protocol and the communication according to the UART protocol are to be temporally separated, the transceiver/receiver 13 subjects the signal, which is received from the CAN bus Bc, to analog-digital conversion, and the select circuit 14 in a subsequent stage discriminates the received protocol at the timing at which any communication is carried out. Upon transmission, the transceiver/receiver 13 subjects the digital signal of the message, which is from the MCU 5, to digital-analog conversion and outputs the analog signal thereof to the CAN bus Bc at the timing at which any communication is carried out. The protocols can be more reliably separated by carrying out both temporal separation and frequency separation.

The select circuit 14 discriminates whether the digital signal inputted via the transceiver/receiver 13 is using the CAN protocol or the UART protocol. The select circuit 14 carries out switching control so that the digital signal is outputted to the MCU 5 in the case of the CAN protocol and the digital signal is outputted to the UART circuit 15 in the case of the UART protocol.

The select circuit 14 discriminates whether the received digital signal is using the CAN protocol or the UART protocol based on the above-described frequency difference or transmission/reception timing information, which has been determined in advance.

Moreover, upon transmission, the select circuit 14 transmits the digital signal of the message, which is inputted from the MCU 5, and the information, which indicates which protocol is to be used for transmission, to the transceiver/receiver 13; alternatively, based on the information, which indicates which protocol is to be used for transmission, and the transmission/reception timing information, which has been determined in advance, the select circuit 14 transmits the digital signal of the message, which is inputted from the MCU 5, to the transceiver/receiver 13 at determined timing.

The UART circuit 15 determines whether the digital signal, which is inputted via the select circuit 14, matches an UART format; if matched, the digital signal is outputted to the ID determination circuit 16.

The ID determination circuit 16 detects a CAN ID, which is a recognition number of the input digital signal, determines whether the CAN ID is the same as a CAN ID allocated to each ECU, and, if it is the same CAN ID, outputs an enable signal EN, which is a control signal, to the regulator 4.

The register 17 stores the information which indicates that the regulator 4 is caused to be in the ON state by the ID determination circuit 16. The on-chip oscillator 18 generates operation clock signals in the CAN transceiver/receiver 2.

FIG. 3 is an explanatory diagram illustrating an example of the communication formats transferred via the CAN bus Bc.

When communication is started, a wait message 19 of the UART format is transferred as a first message at the beginning, and, subsequently, a CAN ID message 20 of the UART format is transferred as a second message. Then, a CAN frame 21 of a CAN format is transferred, and CAN communication is started.

FIG. 4 is an explanatory diagram illustrating an example of a UART data format transferred in the first message and the second message.

The wait message 19, which is the first message, is a message for activation and is composed of: a start of frame (SOF) 19a representing the beginning of a frame; any of data bits 19b composed of, for example, 8 bits; a parity bit 19c; and a stop bit 19d representing the end of data.

The CAN ID message 20, which is the second message, is composed of a SOF 20a representing the beginning of a frame, data bits 20b composed of, for example, an 8-bit CAN ID, a parity bit 20c, and a stop bit 20d representing the end of data.

Herein, the wait message 19 is used for activation wait time processing for ensuring the time necessary until oscillation is stabilized after the on-chip oscillator 18 starts oscillation. However, when time taken until the oscillation of the on-chip oscillator 18 is stabilized is sufficiently short as compared with time taken from reception of the ID message until reception of the CAN frame 21, the CAN ID message 20 may be transmitted while omitting the wait message 19.

The data bits 20b may include not only the CAN ID but also information which sets a communication mode such as one-to-one communication (communication between a master ECU and a particular ECU), simultaneous communication (communication between the master ECU and all the other ECUs), or group communication (communication between the master ECU and the ECUs belonging to a particular group).

Regarding this master ECU, when a certain ECU transmits messages to the other ECU(s), the ECU of the transmission source serves as the master ECU at different times. However, a particular ECU may fixedly serve as a master.

Next, operations in the ECU 1 according to the present embodiment will be described with reference to a flow chart of FIG. 5.

First of all, when the transceiver/receiver 13 of the CAN transceiver/receiver 2 receives a message via the CAN bus Bc (step S101), the transceiver/receiver 13 converts the message of a differential signal, which is received via the CAN bus Bc, into a digital signal and outputs the signal to the select circuit 14.

The select circuit 14 determines whether the input signal is a message of the CAN format or a message of the UART format (step S102) and, when the message is in the CAN format, outputs the message to the MCU 5.

The MCU 5 determines whether the inputted message is specifying the CAN ID of the ECU 1 (step S103) of its own and, when the CAN ID is of the ECU 1, executes the processing of the message (step S104).

Meanwhile, in the processing of step S102, when the message is in the UART format, the message is outputted to the UART circuit 15. The UART circuit 15 discriminates whether the inputted message matches the UART format and, if matched, the message is outputted to the ID determination circuit 16.

The ID determination circuit 16 determines whether the input message is specifying the CAN ID of its own ECU 1 (step S105). If it is the CAN ID of the ECU 1, the ID determination circuit 16 outputs the enable signal EN to the regulator 4, thereby turning on the regulator 4 and supplying power to the actuator Ac (step S106). At this point, the ID determination circuit 16 carries out processing of writing the information, which indicates that the regulator 4 is in the ON state, to the register 17.

Even when there is an instruction to turn on the regulator 4 according to a message of the UART format in the state in which power has already been supplied to the MCU 5, the process of turning on the regulator 4 by the ID determination circuit 16 can be omitted by writing the information, which indicates that the regulator 4 is in the ON state, to the register 17 in this manner.

When the information indicating that the regulator 4 is in the ON state is written to the register 17, the timer 9 starts count-up and monitors an idle time of the CAN bus Bc. When the idle time of a given time is elapsed, the MCU 5 outputs a power-off instruction signal SD to the ID determination circuit 16.

When the power-off instruction signal SD is received, the ID determination circuit 16 outputs the enable signal EN in an inactive state to the regulator 4, thereby turning off the regulator 4 and stopping power supply of the MCU 5 and the actuator Ac. At this point, the ID determination circuit 16 deletes the information, which indicates that the regulator 4 is in the ON state, from the register 17.

Alternatively, the ID determination circuit 16 may be caused to output the enable signal EN in the inactive state to the regulator 4 by transmitting a power-off message from the ECU serving as the master to the ECU which is not operating.

FIG. 6 is an operation flow chart illustrating an example of the communication between the ECU 1a serving as the master ECU and the ECU 1 serving as the slave ECU.

First of all, when the ECU 1a transmits a message addressed to the ECU 1b (step S201), since this message is for the ECU 1b, the CAN transceiver/receiver 2 of the ECU 1 does not turn on the regulator 4, does not supply power to the MCU 5 of the ECU 1, and does not carry out activation and/or message transfer.

Subsequently, when the ECU 1a transmits, for example, the wait message 19 (FIG. 3), which is the first message of the UART format, to the ECUs 1 and 1b (step S202), the CAN transceivers/receivers 2 of the ECUs 1 and 1b are activated.

Then, the CAN ID message 20 (FIG. 3), which is the second message, is inputted. When this CAN ID message 20 is, for example, addressed to the ECU 1 and the ECU 1b, the CAN transceivers/receivers 2 of the ECUs 1 and 1b activate the regulators 4, respectively, thereby supplying power to the MCU 5 and the actuator Ac of the ECU 1 and the MCU 5 and the actuator Ac of the ECU 1b, respectively (step S203).

Then, when a message of the CAN protocol addressed to the ECU 1 is inputted, the ECU 1 carries out message processing (step S204). When a message of the CAN protocol addressed to the ECU 1b is inputted, the MCU 5 of the ECU 1 determines that the message is not necessary to be processed and discards the message (step S205).

In a step S205, if the CAN transceiver/receiver 2 has a filtering function of the CAN IDs, the message can be discarded without transferring the message to the MCU 5.

Then, when the idle time of the ECU 1 of a given time elapses, the power-off instruction signal SD is outputted from the MCU 5 to the ID determination circuit 16, the regulator 4 is turned off by the ID determination circuit 16, and power-off processing of the MCU 5 and the actuator Ac is executed (step S206).

As a result, according to the present embodiment, power is supplied only to the ECU(s) which is carrying out CAN communication, and power supply to the MCU and the actuator Ac of the ECU(s) which is not carrying out communication is stopped. Therefore, power consumption can be significantly reduced.

Next, a filtering technique of discriminating a UART frame and a CAN frame transmitted via the CAN bus Bc will be described. Herein, an example of an operation in the case of using 500 kps as the baud rate of the communication according to the CAN protocol will be described.

When the baud rate of the CAN communication is 500 kps, 1 bit corresponds to 2 µs. In the CAN frame, the same level does not continue more than 5 bits because of the stuffing function defined by the CAN protocol standard.

Therefore, when 'Lo' continues more than 10 µs, the signal is determined not to be an SOF signal of the CAN frame, and the signal is detected as UART SOF.

As illustrated in FIG. 7, when a falling edge is detected in a received signal, the CAN transceiver/receiver 2 samples data at an interval of, for example, 1 µs. An eleventh sample from the falling edge corresponds to a point of 10 µs. When the samples from the falling edge to a twelfth sample are 'Lo', a DART SOF is detected.

In the UART mode, the CAN transceiver/receiver 2 ignores the CAN frame and, after the UART SOF detection, connects the received data to the UART circuit 15 (FIG. 2) so as to start UART reception.

Then, the ID determination circuit 16 (FIG. 2) determines whether the CAN ID contained in the DART frame and the CAN ID of its own ECU are matched. If matched, the select circuit 14 (FIG. 2) connects a connection path to the MCU 5 (CAN mode) and inputs/outputs subsequent data to or from the MCU 5.

Subsequently, a technique of setting the CAN ID will be described.

The CAN ID is set, for example, in the transceiver/receiver 2. For example, a non-volatile semiconductor memory as exemplified by a flash memory is incorporated in the CAN transceiver/receiver 2.

The CAN ID is written to the non-volatile semiconductor memory by using a flash writer or the like. It is not limited to writing the CAN ID in advance by the flash writer or the like. For example, the ECU serving as a master upon activation of the system activates all the ECUs by an all-ECU-activation signal which is a system activation message; and all the ECUs transmit CAN frames, acquire CAN IDs in the order of the transmission, and store the IDs in the non-volatile semiconductor memories thereof, respectively.

In an existing communication protocol of the CAN, any of the ECUs which is going to start message transmission can start transmission of a message when another ECU is not transmitting a message on the network.

At the point of CAN ID acquisition, any of the ECUs cannot transmit a message to the ECU serving as a master while specifying its own ECU, and a CAN ID acquisition request message is transmitted by the existing communication protocol.

In this case, when a plurality of ECUs transmit the CAN ID acquisition request messages, congestion of signals occur on the network, and such a situation that the ECU serving as the master cannot correctly receive the message occurs.

When the ECUs, which have transmitted the CAN ID acquisition request message, detect that the congestion of signals on the network has occurred, the ECUs once stop transmission of the message, and repeat re-transmission of the CAN ID acquisition request message after a certain period of time elapses, thereby sequentially acquiring CAN IDs.

Alternatively, the CAN ID can be mounted on the CAN transceiver/receiver 2 in advance in terms of hardware, and, for example, as illustrated in FIG. 8, the configuration in which the CAN ID is set by using an external resistance R1 may be employed.

In this case, the CAN transceiver/receiver 2 has a configuration in which a resistance 22 for voltage division and an A/D converter 23 are provided. A power-source voltage VDD is connected to one of connecting parts of a resistance R1, and one of the connecting parts of the resistance 22 is connected to the other connecting part of the resistance R1.

A reference potential VSS is connected to the other connecting part of the resistance 22. The connecting part of the resistance R1 and the resistance 22 is connected to an input part of the A/D converter 23, and an output part of the A/D converter 23 is connected to the register 17.

The voltage divided by the resistance R1 and the resistance 22 is converted into digital data by the A/D converter 23. When the digital data is stored in the register 17, the CAN ID is set. Therefore, the CAN ID is set by the value of the voltage divided by the resistance R1 and the resistance 22.

Except for that, a CAN ID may be stored in a memory or the like provided in the MCU 5, and the CAN ID may be set to the CAN transceiver/receiver 2 by the MCU 5.

Second Embodiment

Figure 9:
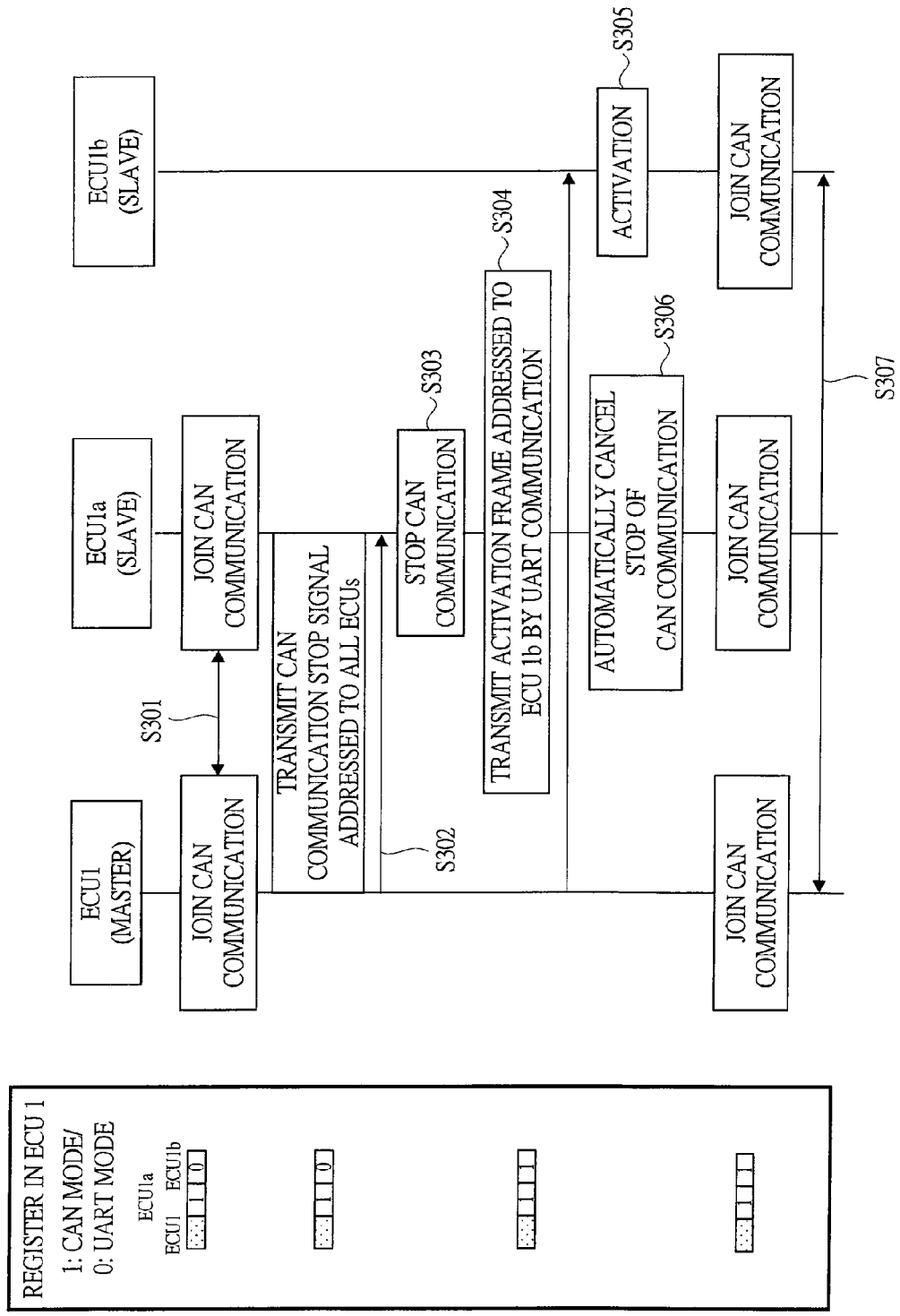
FIG. 9 is an operation flow chart illustrating an example of communication between a master ECU and slave ECUs according to a second embodiment of the present invention.
Figure 10:
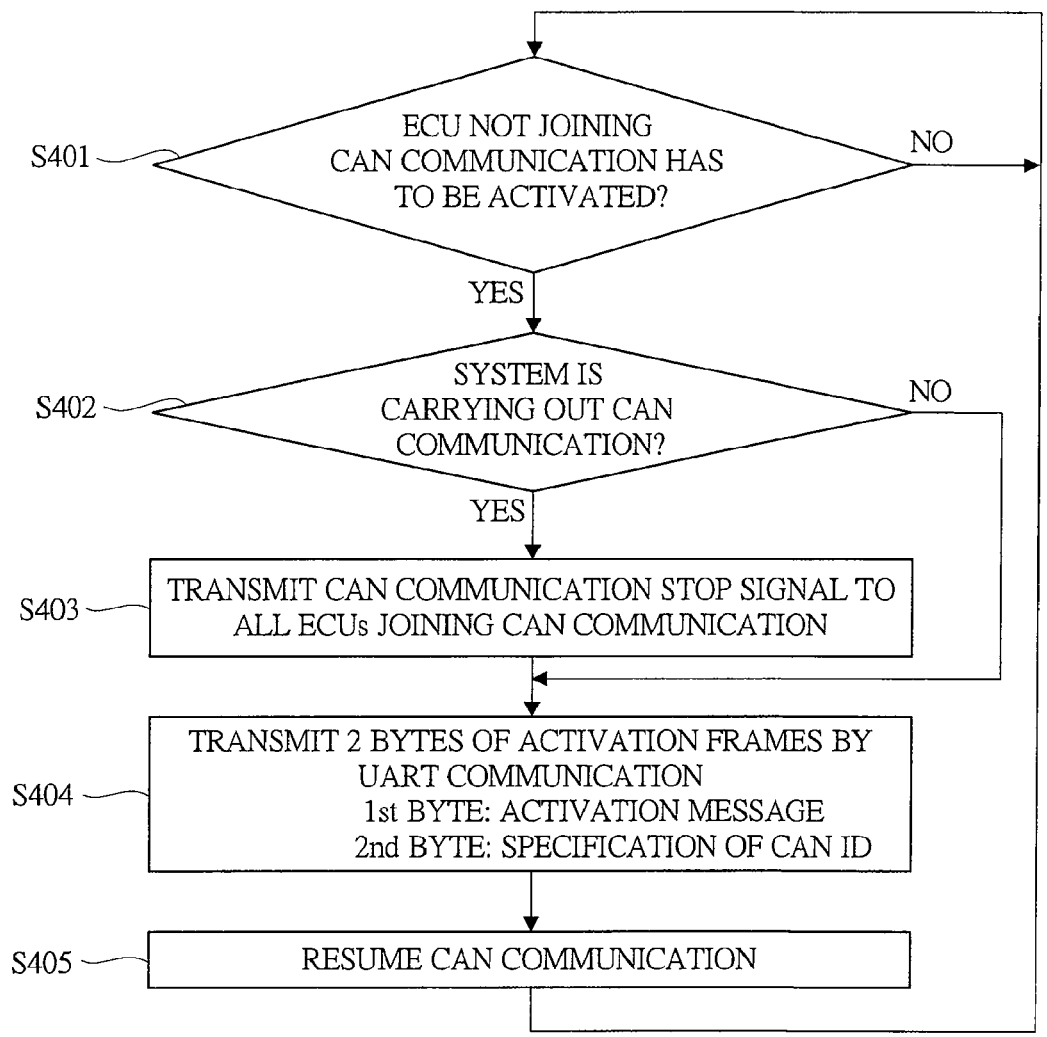
FIG. 10 is a flow chart illustrating an example of an operation of the master ECU in FIG. 9.
Figure 11:
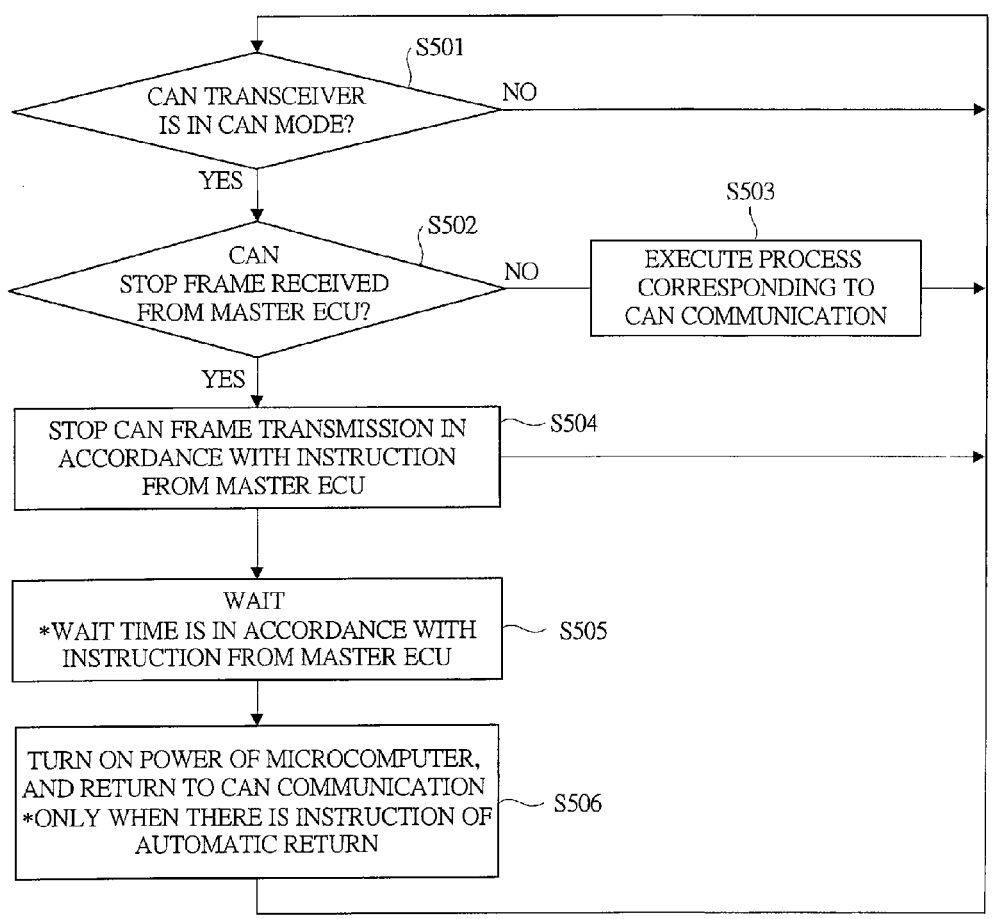
FIG. 11 is a flow chart illustrating an example of an operation of the slave ECU participating in the CAN communication in FIG. 10.
Figure 12:
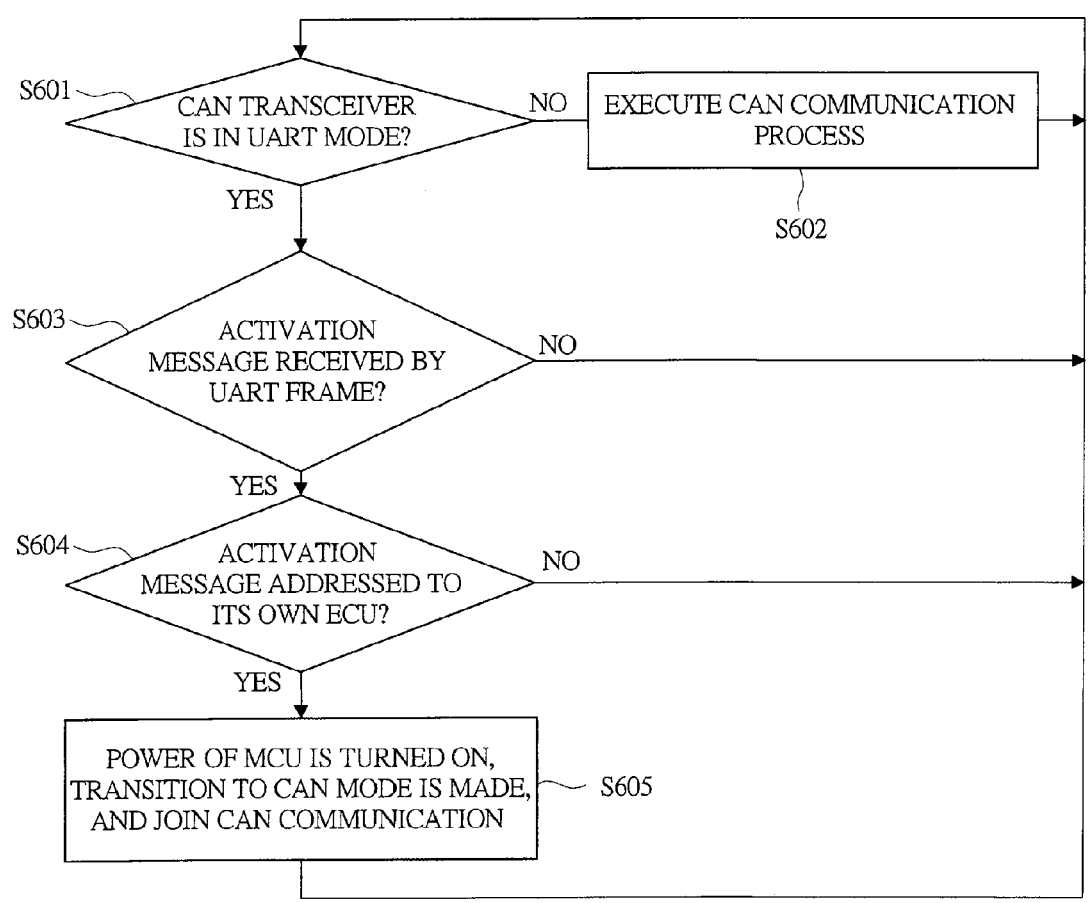
FIG. 12 is a flow chart illustrating an example of an operation of the slave ECU not participating in the CAN communication in FIG. 10.

FIG. 9 is an operation flow chart illustrating an example of communication between a master ECU and slave ECUs according to a second embodiment of the present invention, FIG. 10 is a flow chart illustrating an example of an operation of the master ECU in FIG. 9, FIG. 11 is a flow chart illustrating an example of an operation of the slave ECU participating in the CAN communication in FIG. 10, FIG. 12 is a flow chart illustrating an example of an operation of the slave ECU not participating in the CAN communication in FIG. 10.

In the second embodiment, the technique of activating the ECU to which power is not supplied (communication according to the CAN protocol is not being carried out) and starting communication in the in-vehicle network of the vehicle illustrated in FIG. 1 of the first embodiment will be described.

FIG. 9 is an operation flow chart illustrating an example of the communication between the ECU 1 serving as a master ECU and the ECUs 1a and 1b serving as slave ECUs.

In FIG. 9, illustrated operations are such that the ECU 1 and the ECU 1a are carrying out CAN communication; then, the ECU 1b not carrying out CAN communication is activated and caused to carry out CAN communication. On the left side of FIG. 9, a state of the register 17 (FIG. 2) provided in the ECU 1 is illustrated.

From the left to the right of the register 17, state data of the ECU 1, ECU 1a, and the ECU 1b is stored, wherein '1' represents the state that it is participating in CAN communication (hereinafter, referred to as CAN mode), and '1' represents that communication according to the UART protocol can be carried out (hereinafter, referred to as UART mode).

In a state in which the ECU 1 and the ECU 1a are carrying out CAN communication with each other (step S301), if the ECU 1b is required to participate in the CAN communication for some reason, the ECU 1 transmits CAN communication stop frames serving as communication stop messages to all the ECUs being carrying out CAN communication (in this case, ECU 1a) (step S302).

At this point, the ECU 1a is in the CAN mode, and the ECU 1b is in the UART mode. Therefore, the data representing the state of the ECU 1a of the register 17 is '1', and the data representing the state of the ECU 1b is '0'.

A frame to stop the CAN communication is not defined in the CAN protocol. Therefore, the frame is determined depending on the contents of frames in the communication system, and, for example, the CAN communication stop frame is a frame in which all the identifier (ID) bits in the frame are '0'.

When all the ID bits in the frame are '0' as the CAN communication stop frame, this frame is given the highest priority by arbitration of the priority order even when the other ECU is transmitting a message, so that all the ECUs on the CAN bus can receive this frame.

Then, when all the ECUs being carrying out CAN communication (ECU 1a) receive the CAN communication stop frame, the CAN communication is stopped (step S303).

To stop the CAN communication, various patterns are conceivable, for example, a pattern in which transmission of CAN frames is stopped for a given time period specified by the ECU 1, and the ECU automatically returns to the CAN communication when the period elapses; and a pattern in which the CAN communication is stopped, the power of the MCU 5 (FIG. 1) is turned off, and the CAN transceiver/receiver 2 (FIG. 1) undergoes a transition to a mode in which communication according to the UART protocol is carried out and shifts to a standby state.

Note that, in FIG. 9, the CAN communication stop frame transmitted by the ECU 1 is configured to have the pattern in which the ECU 1a automatically returns to CAN communication when a given period specified by the ECU 1 elapses.

Moreover, when the ECU automatically returns to the CAN communication, the CAN transceiver/receiver 2 waits in the state capable of carrying out the CAN communication, and the power of the MCU 5 is not turned off.

Subsequently, the ECU 1b activates the ECU 1b, which is desired to newly participate in the CAN communication, by using the communication of the UART protocol by the techniques described in the first embodiment (steps S304, S305).

As a result of the activation of the ECU 1b, the ECU 1b participates in the CAN communication, and the data of the register 17 representing the state of the ECU 1b is rewritten from '0' to '1'.

Then, when the given time period specified by the ECU 1 elapses, the ECU 1a automatically carries out return (step S306), and the state in which all of the ECU 1, ECU 1a, and ECU 1b participate in the CAN communication is achieved (step S307).

Note that, as the method of stopping the CAN communication by the master ECU, other than the method in which the CAN communication of the slave ECU is stopped by the CAN frame in the above-described manner, for example, the CAN communication can be stopped by superimposing a stop signal on a normal signal if optical communication or the like is used.

Instead of outputting the CAN communication stop frame by the ECU 1 in step S302, the ECU 1b can be activated by the communication of the UART protocol (let's call it step S302').

In this case, the ECU 1a detects that the ECU 1 is carrying out communication of the UART protocol, and the ECU 1a is controlled so that CAN communication is not carried out during the communication period. When this operation is carried out, the process can be transitioned to step S307 after step S302' is carried out.

FIG. 10 is a flow chart illustrating an example of the operation of the ECU 1 serving as the master when the ECU not being carrying out CAN communication is to be activated and caused to start CAN communication.

First of all, when there is an ECU not participating in CAN communication, the ECU 1 determines whether that ECU has to be activated (step S401). When it is determined that the ECU not participating in CAN communication has to be activated, the ECU 1 determines whether the system of the in-vehicle network is carrying out CAN communication (step S402).

If the system is not carrying out CAN communication, the process of step S404, which is described later, is executed. If the system is carrying out CAN communication, the ECU 1 transmits the CAN communication stop frames to all of the ECUs which are participating in the CAN communication (step S403), thereby stopping the CAN communication of the ECUs.

When the CAN communication of all the ECUs participating in the CAN communication is stopped, the ECU 1 activates the ECU 1b, which is desired to newly participate in CAN communication, by using communication of the UART protocol (step S404).

In this case, as described in the first embodiment, the wait message of the UART format is transferred as the first message at the beginning, and the CAN ID message of the UART format is subsequently transferred as the second message.

Then, in the process of step S404, when the ECU desired to be activated is activated, the CAN frame 21 of the CAN format is transferred, and CAN communication is started (step S405).

FIG. 11 is a flow chart illustrating the operation of the ECU 1a, which is the slave ECU carrying out CAN communication, when the ECU 1 to be the master upon start of CAN communication by activating an ECU not carrying out CAN communication activates the ECU 1b not carrying out CAN communication.

First of all, the ECU 1b determines whether the CAN transceiver/receiver 2 is in the CAN mode (step S501). If the CAN transceiver/receiver 2 is in the CAN mode, whether the CAN communication stop frame has been transmitted from the master ECU 1 is determined (step S502).

If the CAN communication stop frame has not been transmitted from the ECU 1, execution processes corresponding to normal communication of the CAN protocol is carried out (step S503). If the CAN communication stop frame has been transmitted from the ECU 1, based on the instruction thereof, the CAN transceiver/receiver 2 of the ECU 1a turns off the power of the MCU 5 and stops the communication according to the CAN protocol (step S504).

Then, after the state of step S504 is maintained for a given time period specified by the ECU 1 (step S505), the CAN transceiver/receiver 2 turns on the power of the MCU 5 and returns to the communication according to the CAN protocol (step S506).

Herein, in the process of step S504, the power of the MCU 5 of the ECU 1a is turned off so as to stop the communication according to the CAN protocol by the instruction from the ECU 1; however, other than that, for example, the instruction of the ECU 1 may be a process in which only the communication according to the CAN protocol is stopped without turning off the power of the MCU 5 of the ECU 1a.

FIG. 12 is a flow chart illustrating an example of the operation of the ECU 1b when the ECU 1 serving as the master activates the ECU 1b, which is not in the CAN mode, and starts CAN communication.

First of all, the ECU 1b determines whether the CAN transceiver/receiver 2 is in the CAN mode or in the UART mode (step S601). When the CAN transceiver/receiver 2 is in the CAN mode, the ECU 1b carries out an execution process corresponding to the case of normal communication of the CAN protocol (step S602).

In the process of step S601, when the CAN transceiver/receiver 2 is in the UART mode, whether the message according to the UART format which activates the ECU has been received is determined (step S603).

In the process of step S603, when the message is received, the ECU 1b determines whether the received message is a message addressed to its own ECU (1b) (step S604). If it is the message addressed to its own ECU, based on the message, the CAN transceiver/receiver 2 of the ECU 1b turns on the power of the MCU 5 and causes the ECU 1b to participate in CAN communication (step S605).

The above-described technique of activating the ECU to which power is not supplied (not carrying out communication according to the CAN protocol) and causing the ECU to start communication is effective for reducing damage and preventing secondary accidents in an emergency. In the communication of the messages of FIGS. 10 12 according to the UART format in such a case, the communication by the signal superimposition using different frequency bands can be carried out so that the communication according to the CAN format is not disturbed. The communication of unnecessary ECUs can be stopped, and the ECUs required to participate in communication can be activated while carrying out the CAN communication of a brake, airbags, and the like which is required for safety drive of the vehicle.

When a radar ECU which monitors the surrounding area of the vehicle detects that another vehicle is abnormally close, ECUs controlling airbags and seatbelts are activated to prepare for any occurrence of a collision accident, thereby fixing the seatbelts before occurrence of the collision, expanding the airbags immediately before or immediately after the occurrence of the collision, and reducing physical damage of passengers. Alternatively, the damage caused on pedestrians and the like can be reduced by detecting the closeness of its own vehicle with respect to the pedestrians, and the like, activating a brake control ECU, and carrying out speed-reduction control.

For example, in the case of a fuel-cell vehicle, when leakage of a gas such as a hydrogen gas is detected upon collision (communication between a master ECU and a gas-sensor ECU), the master ECU activates the ECUs controlling a sunroof, windows, sliding doors, air conditioners, and the like, thereby carrying out ventilation of the interior of the vehicle, so that fire or explosion that is caused when the interior of the vehicle is filled with the hydrogen gas can be prevented.

In the case of a hybrid vehicle or an electric vehicle, if an ECU which carries out power control is not participating in CAN communication upon collision or the like, the ECUs of power control systems are activated so as to urgently cool down a battery and battery-peripheral devices by a fan (and a radiator), and the like, thereby preventing fire caused by battery fire.

Furthermore, upon collision or the like, corresponding ECUs can be activated so as to, for example, light a room light, blink hazard lamps, sound a horn, inform the occurrence of an accident by a report or the like by telematics, and, if doors are locked, unlock the door locks for evacuation.

Third Embodiment

Figure 13:
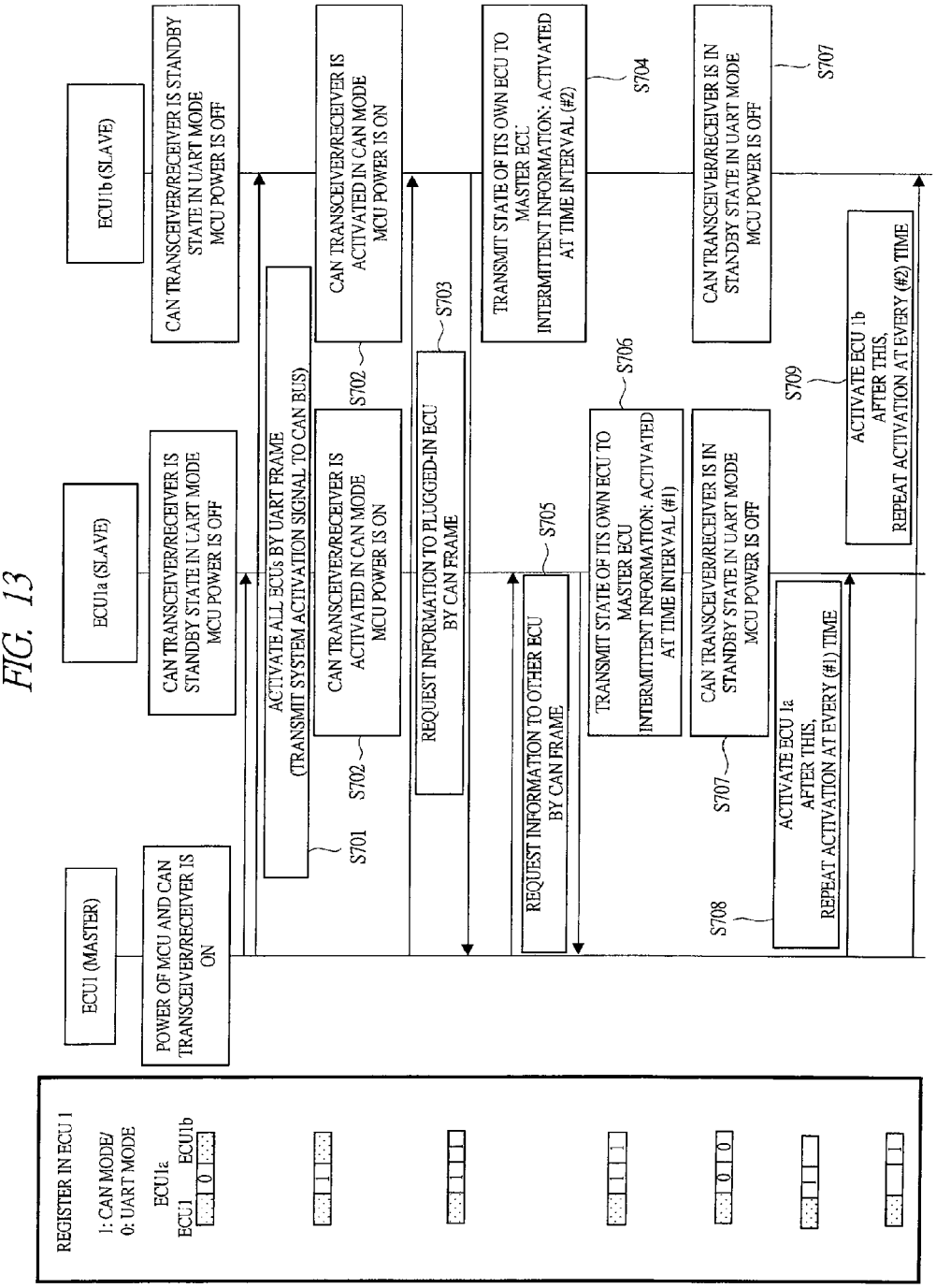
Figure 14:
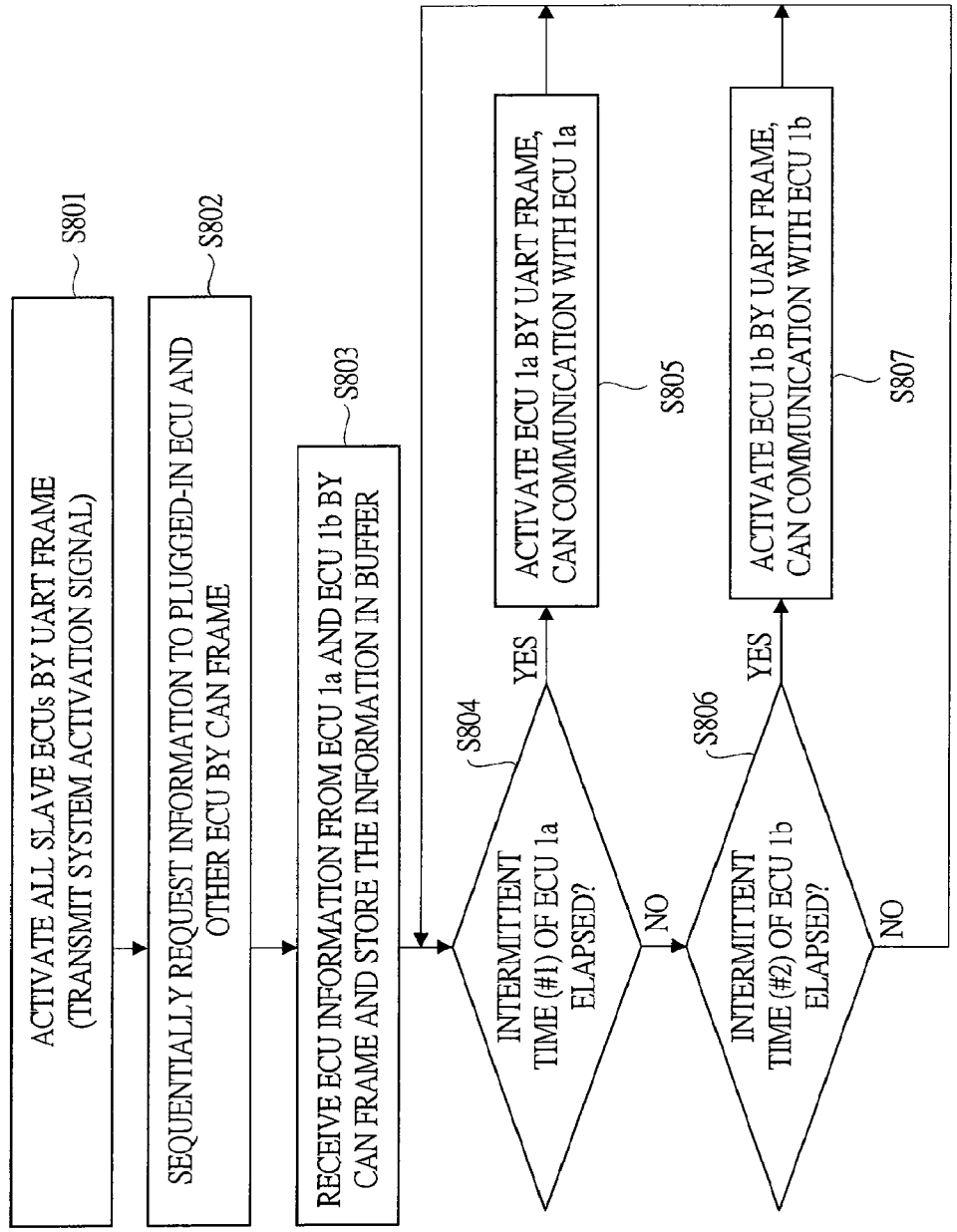
FIG. 14 is a flow chart illustrating an example of an operation of the master ECU in operation of FIG. 13.
Figure 15:
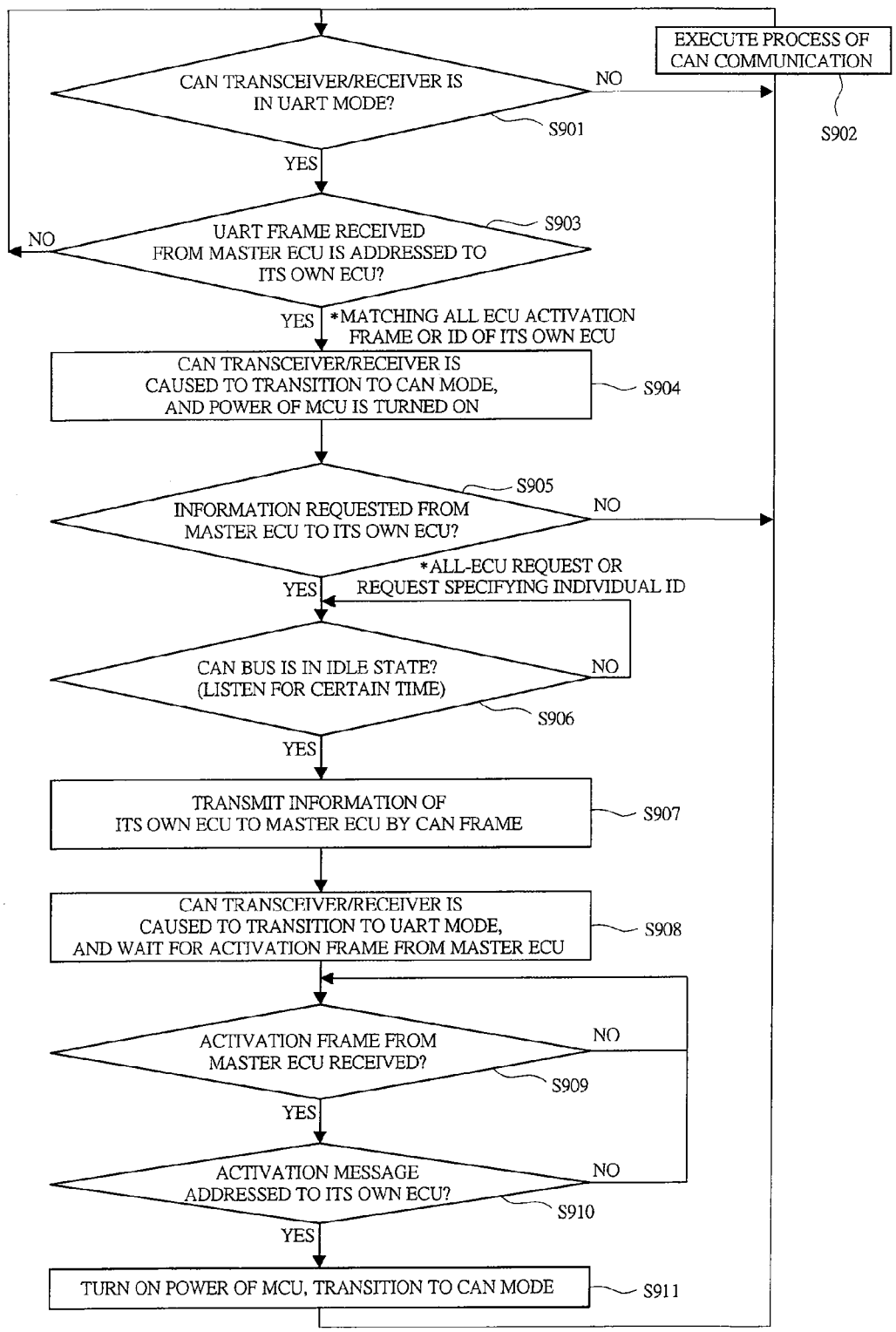
FIG. 15 is a flow chart illustrating an example of the operation of the already-existing slave ECU in the operation of FIG. 13.
Figure 16:
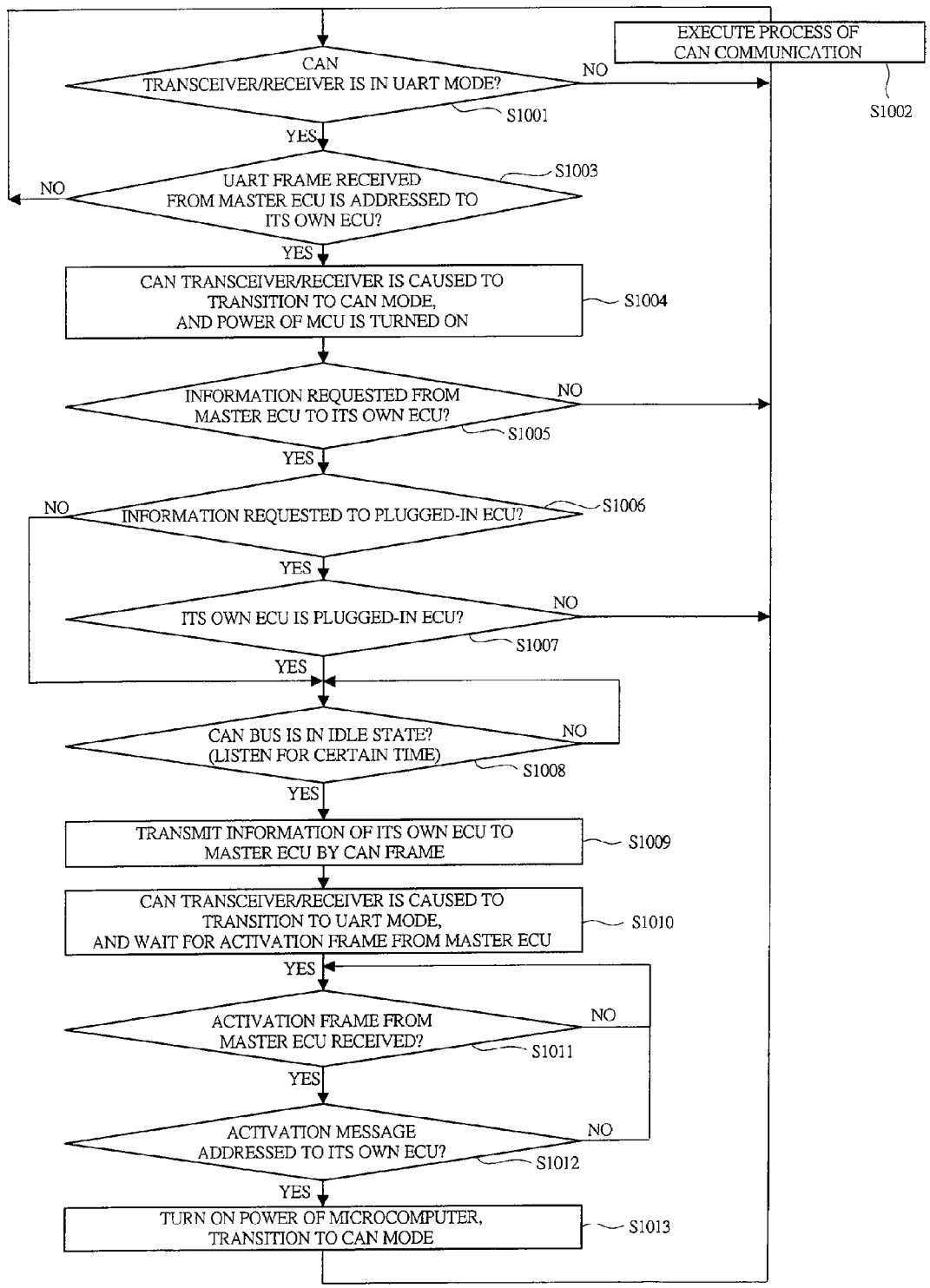
FIG. 16 is a flow chart illustrating an example of the operation of the plugged-in slave ECU in the operation of FIG. 13.

FIG. 13 is an operation flow chart illustrating an example of communication according to a third embodiment of the present invention between a master ECU and slave ECUs having an ECU being plugged in, FIG. 14 is a flow chart illustrating an example of an operation of the master ECU in operation of FIG. 13, FIG. 15 is a flow chart illustrating an example of the operation of the already-existing slave ECU in the operation of FIG. 13, FIG. 16 is a flow chart illustrating an example of the operation of the plugged-in slave ECU in the operation of FIG. 13.

In the third embodiment, the technique of notifying a master ECU of the ECU information serving as operation recognition information of a plugged-in ECU when the ECU is newly plugged in the in-vehicle network of the vehicle illustrated in FIG. 1 of the first embodiment will be described.

Herein, "plug-in" means newly connecting an ECU, which is not present at the point CAN has been previously operated, is newly connected to CAN such as addition or exchange of a car navigation system.

FIG. 13 is an operation flow chart illustrating an example of the communication between the ECU 1 serving as the master ECU and the ECUs 1a and 1b serving as slave ECUs in the case in which the ECU is newly plugged in. Herein, in FIG. 13, the ECU 1b (FIG. 1) is assumed to be the newly plugged-in ECU.

The ECU 1 serving as the master is in the state in which power is supplied to the MCU 5 and the CAN transceiver/receiver 2. In the ECU 1a of the slave, the CAN transceiver/receiver 2 is in a standby state in the UART mode, and the power of the MCU 5 is turned off. In the plugged-in ECU 1b, the CAN transceiver/receiver 2 is in a standby state in the UART mode, and the power of the MCU 5 is turned off.

Moreover, in FIG. 13, both the slave ECUs 1a and 1b are assumed to be the ECUs which carry out intermittent operations. Furthermore, on the left side of the drawing, the state of the register 17 (FIG. 2) provided in the ECU 1 is illustrated, wherein the state data of the ECU 1, ECU 1a, and ECU 1b is stored from the left to the right of the register 17. In the register 17, '1' represents the CAN mode, and '0' represents the UART mode.

First of all, the ECU 1 transmits all-ECU activation signals, which activate all of the ECUs, to all of the ECUs by the UART frames via the CAN bus Bs (step S701).

This all-ECU activation signal is composed of, for example, two messages, wherein the first message is the message representing activation of all the ECUs in the CAN ID message 20 of FIG. 4, and the second message is a signal which means that this is a message for acquiring activation information.

In each of the ECUs 1a and 1b, when the all-ECU activation signals are received, the CAN transceiver/receiver 2 is activated by the CAN mode, and the power of the MCU 5 is turned on (step S702).

Subsequently, the ECU 1 makes an inquiry whether there is any newly plugged-in ECU (step S703). Based on the request of the ECU 1, the plugged-in ECU 1b transmits ECU information (CAN ID, operation information, and the like) of its own ECU 1b to the ECU 1 by a CAN frame (step S704).

Then, the ECU 1 also requests ECU information with respect to the remaining ECU 1a (step S705) and acquires the ECU information (step S706). Then, when a given time elapses, the CAN transceivers/receivers 2 of the ECUs 1a and 1b become the standby state in the UART mode, and the power of the MCU 5 of the ECUs 1a and 1b is turned off (step S707).

Based on the ECU information acquired in the process of steps S704 and S706, the ECU 1 repeats activation of the ECU 1a (step S708) and activation of the ECU 1b (step S709).

FIG. 14 is a flow chart illustrating an example of the operation of the ECU 1 serving as the master in the operation of FIG. 13.

First of all, the ECU 1 transmits the all-ECU activation signal to all the ECUs (ECUs 1a and 1b) by the UART frame via the CAN bus Bc (step S801), thereby activating the CAN mode. Subsequently, the ECU 1 requests the ECU information to each of the plugged-in ECU 1b and the other already-existing ECU 1a by the CAN frame (step S802).

When the ECU information from all of the ECUs is acquired, the ECU 1 stores the acquired ECU information in a buffer or the like (step S803). The ECU 1 determines whether intermittent time of the ECU 1a has elapsed (step S804). If the intermittent time has elapsed, the ECU 1 activates the ECU 1a by the UART frame, thereby starting CAN communication with the ECU 1a (step S805).

In the process of step S804, if the intermittent time of the ECU 1a has not elapsed, the ECU 1 determines whether the intermittent time of the ECU 1b has elapsed (step S806) If the intermittent time has elapsed, the ECU 1 activates the ECU 1b by the UART frame, thereby starting CAN communication with the ECU 1b.

FIG. 15 is a flow chart illustrating an example of the operation of the already-existing ECU 1a serving as the slave in the operation of FIG. 13.

First of all, the ECU 1a determines whether the CAN transceiver/receiver 2 is in the DART mode (step S901). In the case of the CAN mode, the ECU 1a carries out an execution process corresponding to normal communication of the CAN protocol (step S902).

In the process of step S901, when the CAN transceiver/receiver 2 is in the DART mode, the ECU 1a determines whether the DART frame received from the ECU 1 serving as the master is addressed to its own ECU 1a or whether it is the all-ECU activation signal (step S903).

If the UART frame is addressed to its own ECU 1a or the all-ECU activation signal, the CAN transceiver/receiver 2 transitions to the CAN mode, and the power of the MCU 5 is turned on (step S904). In addition, if the UART frame is neither the frame addressed to its own ECU 1a nor the all-ECU activation signal, the ECU 1a returns to the process of step S901.

Subsequently, the ECU 1a determines whether there is an acquisition request of the ECU information of its own ECU 1a (step S905). If there is no acquisition request of the ECU information of the ECU 1a, the process of step S902 is executed.

If there is the acquisition request of the ECU information, the ECU 1a checks whether the CAN bus Bc is in an idle state for a given time period (step S906). If the bus is in the idle state, the ECU information of the ECU 1a is transmitted to the ECU 1 by the CAN frame (step S907).

Then, the ECU 1a causes the CAN transceiver/receiver 2 to transition to the UART mode and waits for an activation message from the ECU 1 (step S908). When the activation message from the ECU 1 is received (step S909), whether it is a message addressed to its own ECU 1a is determined (step S910). If it is the message addressed to the ECU 1a, the ECU 1a turns on the power of the MCU 5, transitions to the CAN mode (step S911), and executes the process of step S902.

FIG. 16 is a flow chart illustrating an example of the operation of the plugged-in ECU 1b serving as the slave in the operation of FIG. 13.

First of all, the ECU 1b determines whether the CAN transceiver/receiver 2 is in the UART mode (step S1001). When the CAN transceiver/receiver 2 is in the CAN mode, the ECU 1b carries out an execution process corresponding to normal communication of the CAN protocol (step S1002). When the CAN transceiver/receiver 2 is in the UART mode, the ECU 1b determines whether the UART frame received from the master ECU 1 is addressed to its own ECU 1b, the all-ECU activation signal, or the acquisition request to the plugged-in ECU (step S1003).

If the UART frame is addressed to the ECU 1b, the UART frame is the all-ECU activation signal, or the UART frame is the acquisition request to the plugged-in ECU, the CAN transceiver/receiver 2 transitions to the CAN mode, and the power of the MCU 5 is turned on (step S1004).

Subsequently, the ECU 1b determines whether there is the acquisition request of the ECU information of the ECU 1b (step S1005). If there is no acquisition request of the ECU information of the ECU 1b, the process of step S1002 is executed.

In the process of step S1005, if there is the acquisition request of the ECU information, the ECU 1b checks whether the acquisition request is an acquisition request of the ECU information to the plugged-in ECU (step S1006). If it is the acquisition request of the ECU information to the plugged-in ECU, the ECU 1b determines whether its own ECU 1b is a plugged-in ECU (step S1007).

In the process of step S1006, if it is not the acquisition request of the ECU information to the plugged-in ECU, the ECU 1b executes a process of step S1008, which will be described later. If the ECU is not determined to be the plugged-in ECU in the process of step S1007, the process of step S1002 is executed.

If the ECU 1b is determined to be the plugged-in ECU, the ECU 1b checks whether the CAN bus Bc is in the idle state for a given time period (step S1008). If the bus is in the idle state, the ECU information of the ECU 1b is transmitted to the ECU 1 by the CAN frame (step S1009).

Subsequently, the ECU 1b causes the CAN transceiver/receiver 2 to transition to the UART mode and waits for an activation message from the ECU 1 (step S1010). When the ECU 1b receives the activation message from the ECU 1 (step S1011), the ECU 1b determines whether it is the message addressed to its own ECU 1b (step S1012). If it is addressed to its own ECU 1b, the ECU 1b turns on the power of the MCU 5, transitions to the CAN mode (step S1013), and executes the process of step S1002.

The already-existing ECU (ECU 1a) and the added ECU (ECU 1b) connected to the CAN network may carry out following processes which are not illustrated in the flows of FIG. 15 and FIG. 16.

Corresponding to the transmission of the ECU information of its own ECU from the ECU 1 and the ECU 1a (step S706 of FIG. 13), the ECU 1b stores the ECU information of the ECU 1 and the ECU 1a in the non-volatile memory in the ECU 1b.

Also, corresponding to the transmission of the ECU information of the ECU 1b from the ECU 1b (step S704 of FIG. 13), the ECU 1a stores the ECU information of the ECU 1b in the non-volatile memory in the ECU 1a.

When the ECU 1a or the ECU 1b serves as a master ECU instead of the ECU 1, carrying out the process of FIG. 14 for acquiring the ECU information of the ECU 1a or the ECU 1b is redundant; and, if the plugged-in ECU 1b is present, all the already-existing ECUs share the information of the plugged-in ECU 1b by an information acquisition process, and the plugged-in ECU similarly shares the information of all the already-existing ECUs by an information acquisition process.

As a result of these processes, all the ECUs connected to the CAN network retain the ECU information of the other ECUs. Even when any of the ECUs serves as a master ECU, intermittent operation control, and the like of the other ECUs can be carried out without carrying out the operation information acquisition process of the other ECUs.

The above-described technique is effective to a newly plugged-in ECU when a newly-added function is attached later as an option or the like of a vehicle.

For example, when a rear wiper provided on a rear window or the like of a vehicle is attached later, a master ECU of body systems transmits an all-ECU activation signal via the CAN bus when power is turned on, thereby activating all ECUs.

The plugged-in ECU transmits the ECU information of the plugged-in ECU to the master ECU in accordance with a request from the master ECU. In this case, the plugged-in ECU is the ECU which operates the rear wiper operated intermittently. Therefore, for example, a CAN ID, the intermittent operation information of the rear wiper, and the like are transmitted as the ECU information.

Then, when the master ECU detects the information that the operation of the rear wiper is turned on, the master ECU activates the plugged-in ECU, which controls the rear wiper, in accordance with the information.

Herein, the ECU controlling the rear wiper is described as an example; however, other than this, similar processes are carried out when various ECUs such as those of navigation systems and audios systems are added.

As the plugged-in ECU is newly added to the in-vehicle network system, which has been optimized, when a problem occurs in the system, the plugged-in ECU more frequently be a cause of failure than the already-existing ECUs.

Therefore, when a problem occurs, the necessity of examining the plugged-in ECU is recognized at the beginning. In this case, CAN IDs (for example, ID 1 to ID 16) set in advance are allocated to the CAN transceivers/receivers 2 of the already-existing ECUs, and a CAN ID other than those is allocated to the plugged-in ECU. When the CAN ID other than the CAN IDs set in advance is distributed via the CAN bus, the ID can be recognized as that of the plugged-in ECU.

Fourth Embodiment

Figure 17:
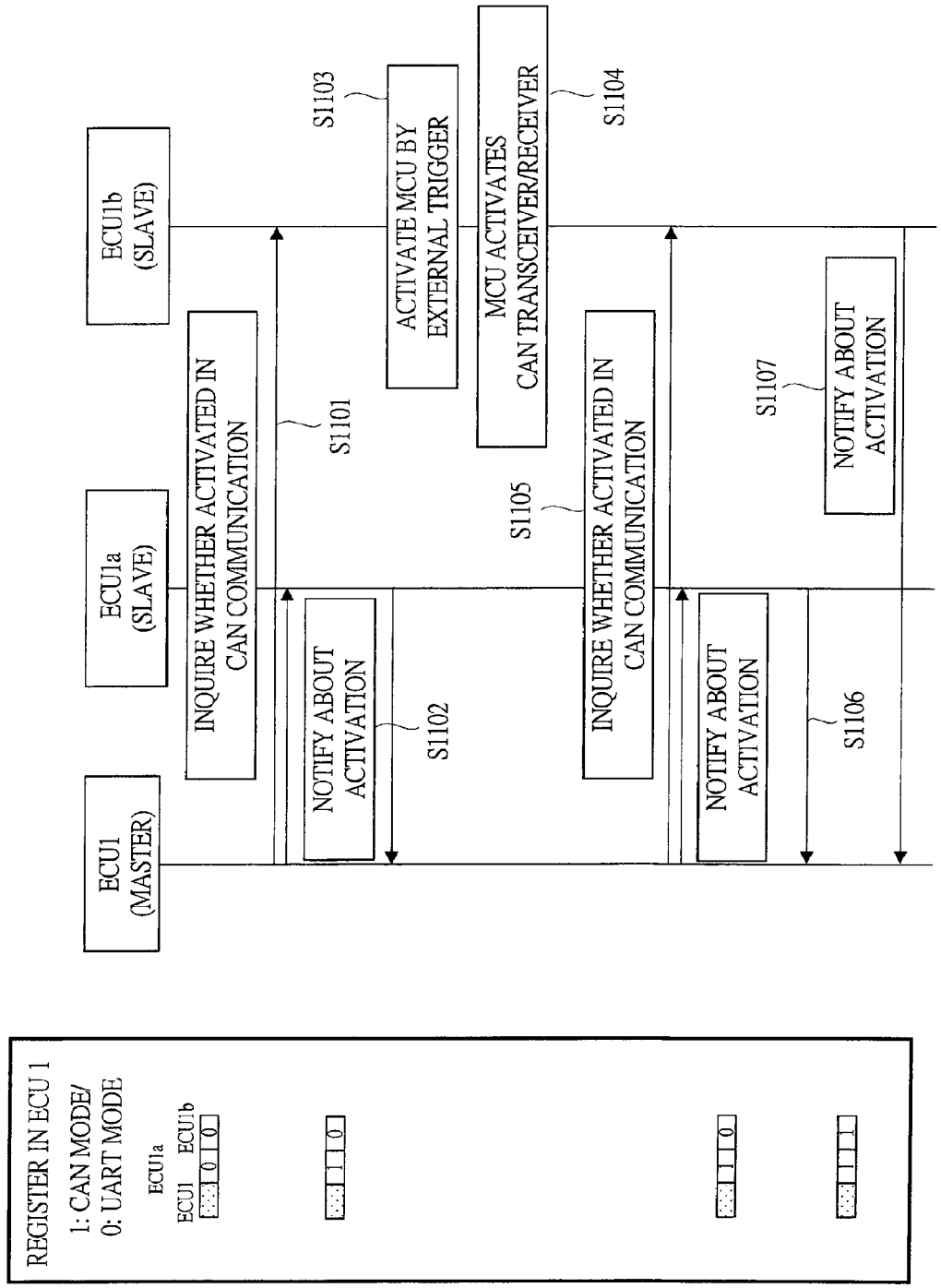
FIG. 17 is a flow chart illustrating an example of an operation according to a fourth embodiment of the present invention in which a master ECU checks whether slave ECUs are participating in CAN communication.

FIG. 17 is a flow chart illustrating an example of an operation according to a fourth embodiment of the present invention in which a master ECU checks whether slave ECUs are participating in CAN communication.

In the forth embodiment, a technique of notifying the master ECU that a certain slave ECU is activated when the slave ECU is activated by an external trigger in the in-vehicle network of the vehicle illustrated in FIG. 1 of the first embodiment will be described.

FIG. 17 is a flowchart illustrating an example of an operation in which the ECU 1 serving as the master checks whether the slave ECUs 1a and 1b are participating in CAN communication.

In FIG. 17, the ECU 1b is assumed to be the ECU which can be activated by the external trigger. On the left side of FIG. 17, a state of the register 17 (FIG. 2) provided in the ECU 1 is illustrated. From the left to the right of the register 17, the state data of the ECU 1, ECU 1a, and ECU 1b is stored, wherein '1' of the register 17 represents the CAN mode, and '0' represents the UART mode.

First of all, the ECU 1 makes an inquiry by communication of the CAN protocol to know whether the ECUs 1a and 1b are activated (step S1101). Herein, since the ECU 1a is activated, the ECU 1a notifies the ECU 1 of the activation (step S1102). As a result, the data representing the state of the ECU 1a of the register 17 becomes '1'.

Then, when the ECU 1b is activated by the external trigger (step S1103), the MCU 5 of the ECU 1b activates the CAN transceiver/receiver 2 (step S1104). Then, the ECU 1 makes an inquiry again by communication of the CAN protocol to know whether the ECUs 1a and 1b are activated (step S1105).

In response to this, the ECU 1a notifies the ECU 1 that it is activated (step S1106). Since the ECU 1b is also activated, the ECU 1b similarly notifies the ECU 1 that it is activated (step 1107). As a result, the data representing the state of the ECU 1a and the data representing the state of the ECU 1b in the register 17 become '1'.

The ECU which can be activated by the external trigger has to detect the external trigger. Therefore, the power of the MCU 5 thereof is not turned off and is caused to be in the standby state, and the CAN transceiver/receiver 2 waits for the message from the master ECU, which activates the ECU which can be activated by the external trigger, in the UART mode.

The master ECU makes an inquiry at every given timing whether the slave ECUs are activated. The ECU which is activated by the external trigger responds to the inquiry if the inquiry is addressed to its own ECU, is the all-ECU activation signal, or is addressed to a newly activated ECU.

Then, the slave ECU may wait in the CAN mode in accordance with an instruction of the master ECU or may be instructed to transition to the UART mode.

Together with the inquiry, the master ECU may give an instruction so that the ECU activated by the external trigger waits in the CAN mode without change or transitions to the UART mode.

Furthermore, the ECU itself activated by the external trigger can notify the master ECU that it is activated.

When the MCU 5 is activated by the external trigger, the MCU 5 activates the CAN transceiver/receiver 2. Subsequently, the MCU 5 carries out control so that a Lo signal is transmitted via the CAN bus for a given time period (for example, about 1 ms) so as to notify the master ECU that the ECU is activated.

This notification by the Lo signal is one-shot transmission so that re-transmission is not repeated when a CAN frame outputted from another ECU and the Lo signal from the ECU collide with each other. Alternatively, in order to prevent the collision with the CAN frame outputted from the other ECU, a different frequency band may be used to carry out the communication.

Then, when the master ECU detects the activation of any of the slave ECUs, the master ECU makes an inquiry to the slave ECU by communication according to the CAN protocol and obtains the ECU information of the activated ECU.

Examples of the ECU activated by the external trigger include an ECU which controls a memory sheet, and the like, wherein the master ECU is notified of this activation when the ECU is activated by a switch of the memory sheet.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, the above-described embodiment has the configuration in which the ECU has the two regulators 3 and 4, and the regulator 4 which supplies power to the MCU 5 and the actuator Ac is subjected to ON/OFF control by the enable signal EN. However, a configuration in which the number of regulator is one, and a power-source voltage is supplied to the MCU 5 and the actuator Ac via a switch may be employed.

In this case, the enable signal EN is a signal which subjects the switch to ON/OFF control, wherein power is supplied to the MCU 5 and the actuator Ac when the switch is ON, and power supply to the MCU 5 and the actuator Ac is stopped when the switch is OFF.

In the above-described embodiments, the case in which CAN is used as the communication network, and the ON/OFF control of the power source of the regulators is controlled by the UART protocol has been described. However, a configuration in which another communication network such as FlexRay™ is used in the communication network, and ON/OFF of the power source of the regulators is controlled by another protocol such as LIN may be employed.

The present invention is suitable for technique to reduce power consumption in a semiconductor integrated circuit device used in a communication system of, for example, a vehicle.

What is claimed is:

1. A communication system for an automotive, comprising:
   a plurality of electrical controller units, a first electrical controller unit of which has an active mode and a low consumption mode; and
   a communication bus coupled with the electrical controller units, wherein
   when the first electrical controller unit is in the low consumption mode,
      a second electrical controller unit outputs a first message for activating the first electrical controller in a first predetermined time to the communication bus, and then outputs a second message including an ID signal of the first electrical controller unit to the communication bus, and
      the first electrical controller unit receives the first message and the second message including the ID signal output by the second electrical controller unit from the communication bus, checks the ID signal whether the ID signal indicates the first electrical controller unit or not, and when the ID signal indicates the first electrical controller unit, the first electrical controller unit shifts to the active mode from the low consumption mode, and
      no ID signal is included in the first message.

2. The communication system according to the claim 1, wherein the first predetermined time is longer than a time for datum in a message on the communication bus.

3. The communication system according to the claim 1, wherein the first electrical controller unit shifts to the low consumption mode from the active mode after waiting a second predetermined time from a completion of a power on sequence.

4. The communication system according to claim 1, wherein
   the communication bus is a Control Area Network (CAN) bus, and
   each of the electrical controller unit includes a CAN interface unit.

5. The communication system according to claim 1, wherein each of the electrical controller unit includes a memory for storing an ID thereof.

* * * * *